March 3, 1942. P. SPURLINO ET AL 2,274,853
CASH REGISTER AND ACCOUNTING MACHINE
Filed April 26, 1939    8 Sheets-Sheet 1
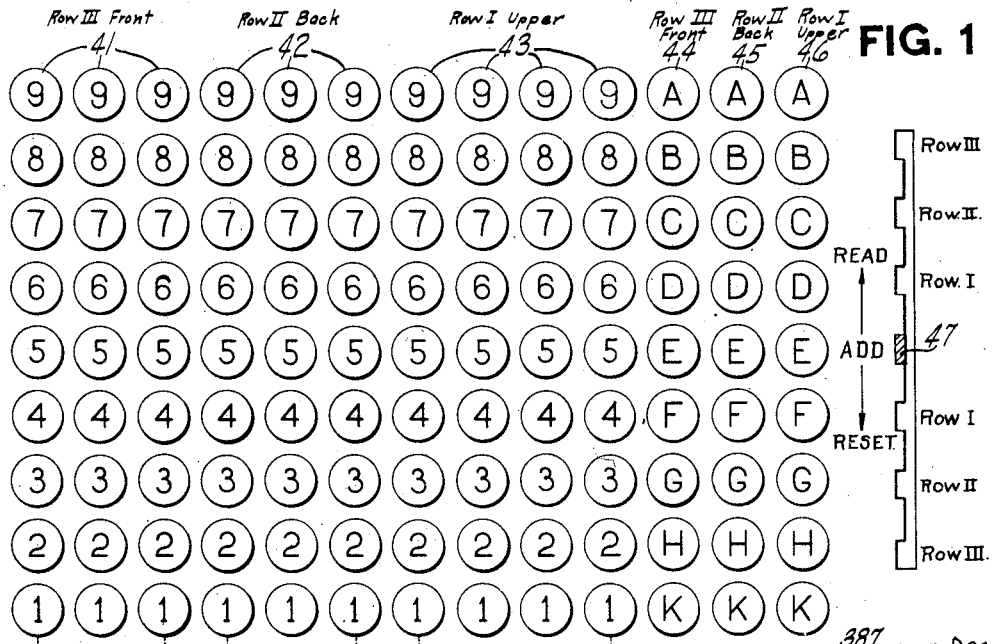
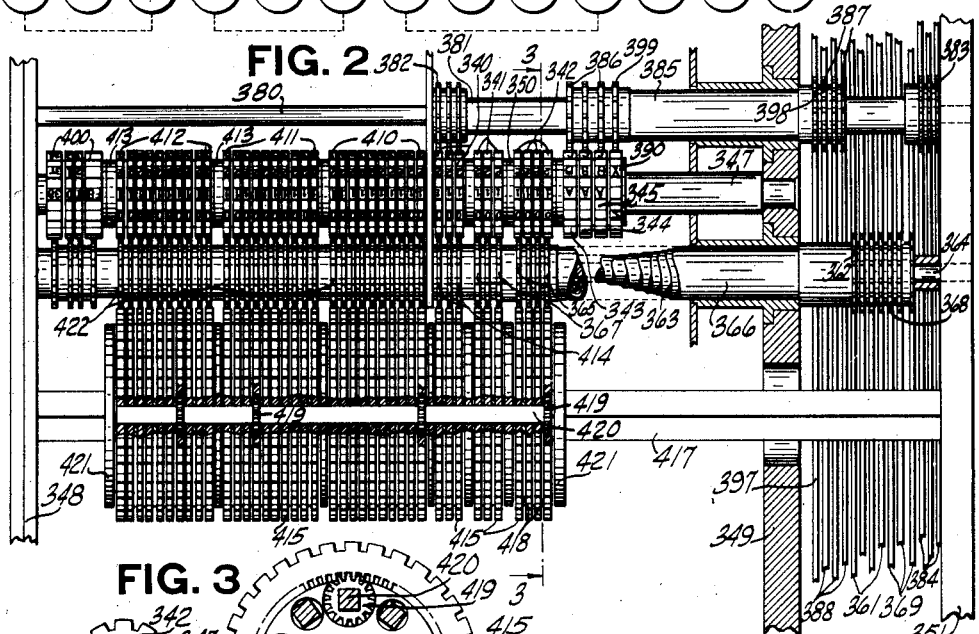
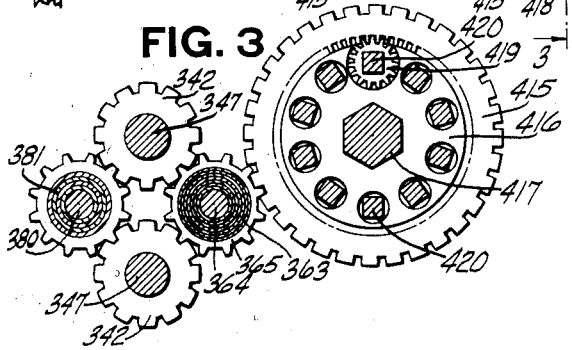
Inventors
Pascal Spurlino and
Willis E. Eickman
By Earl Berst
Their Attorney March 3, 1942. P. SPURLINO ET AL 2,274,853
CASH REGISTER AND ACCOUNTING MACHINE
Filed April 26, 1939 8 Sheets-Sheet 2

Inventors
Pascal Spurlino and
Willis E. Eickman
By Carl Benst
Their Attorney

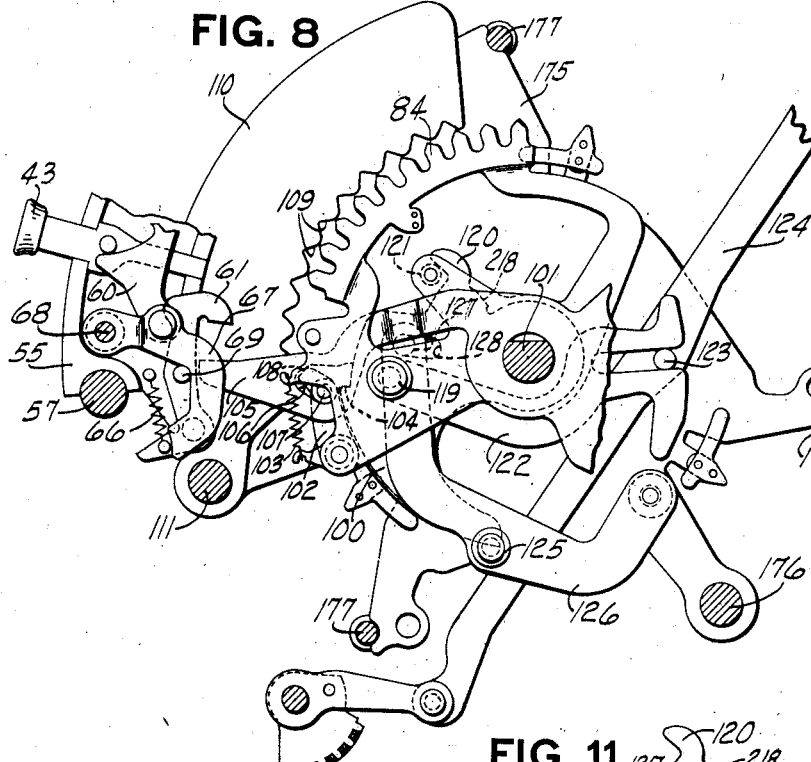
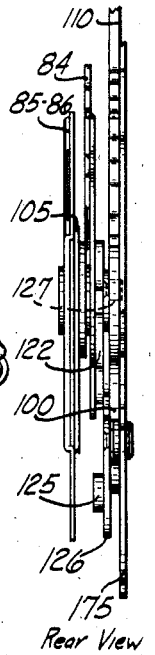
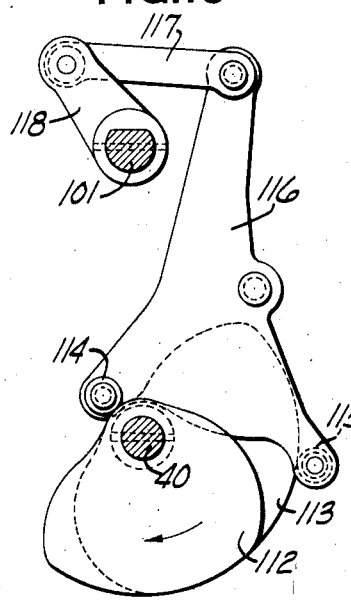
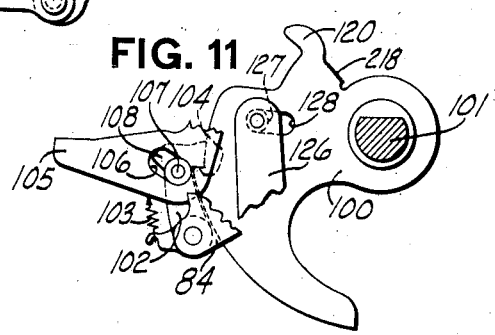
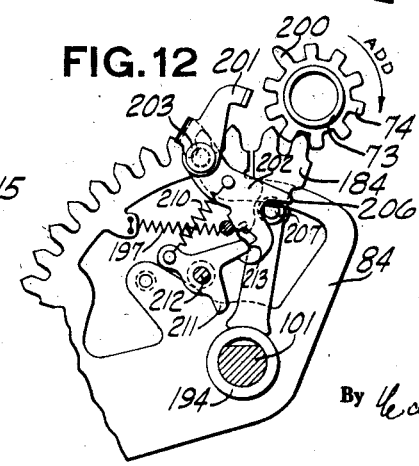

Inventors
Pascal Spurlino and
Willis E. Eickman

By Carl Beust

Their Attorney

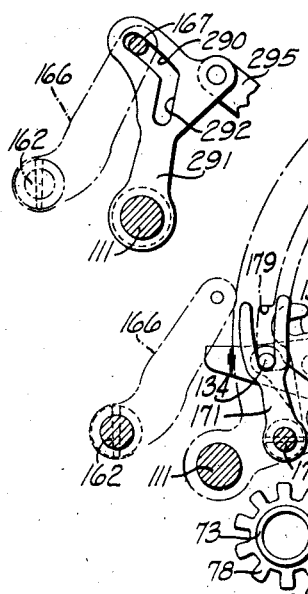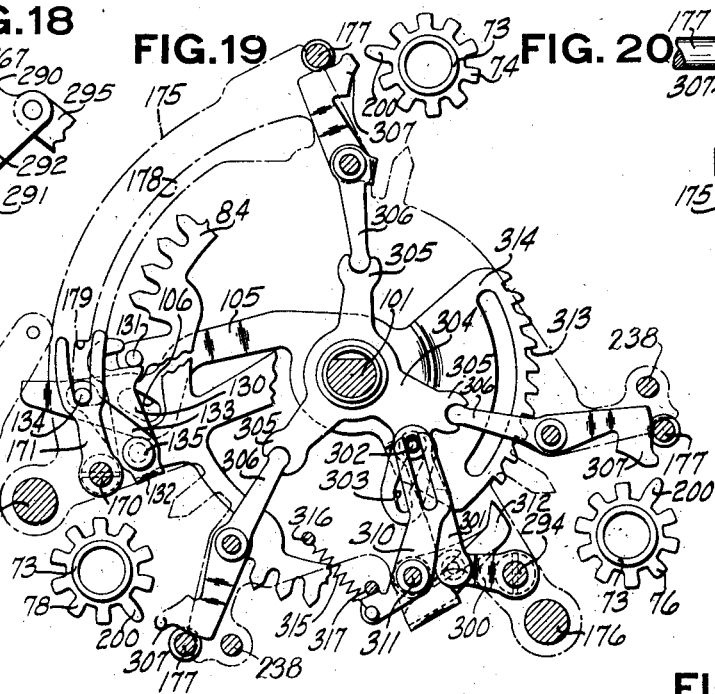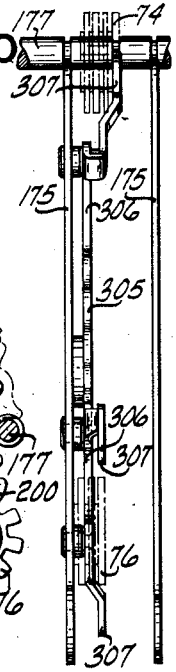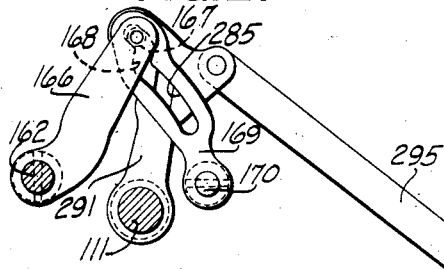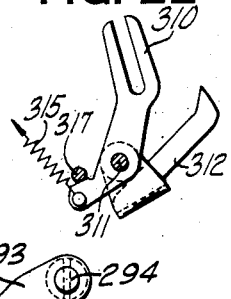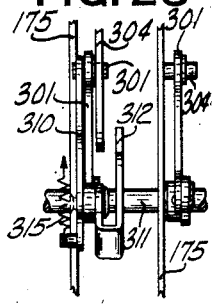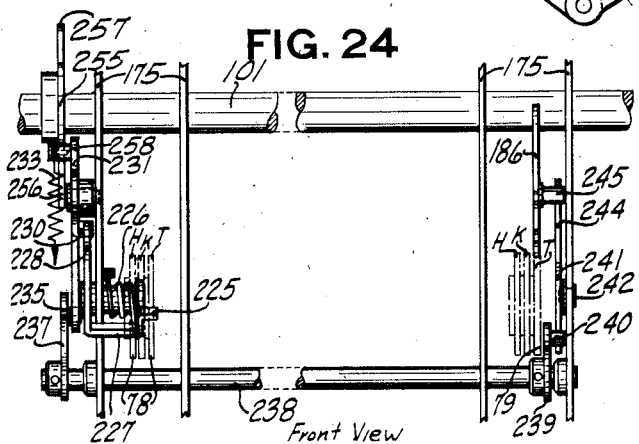

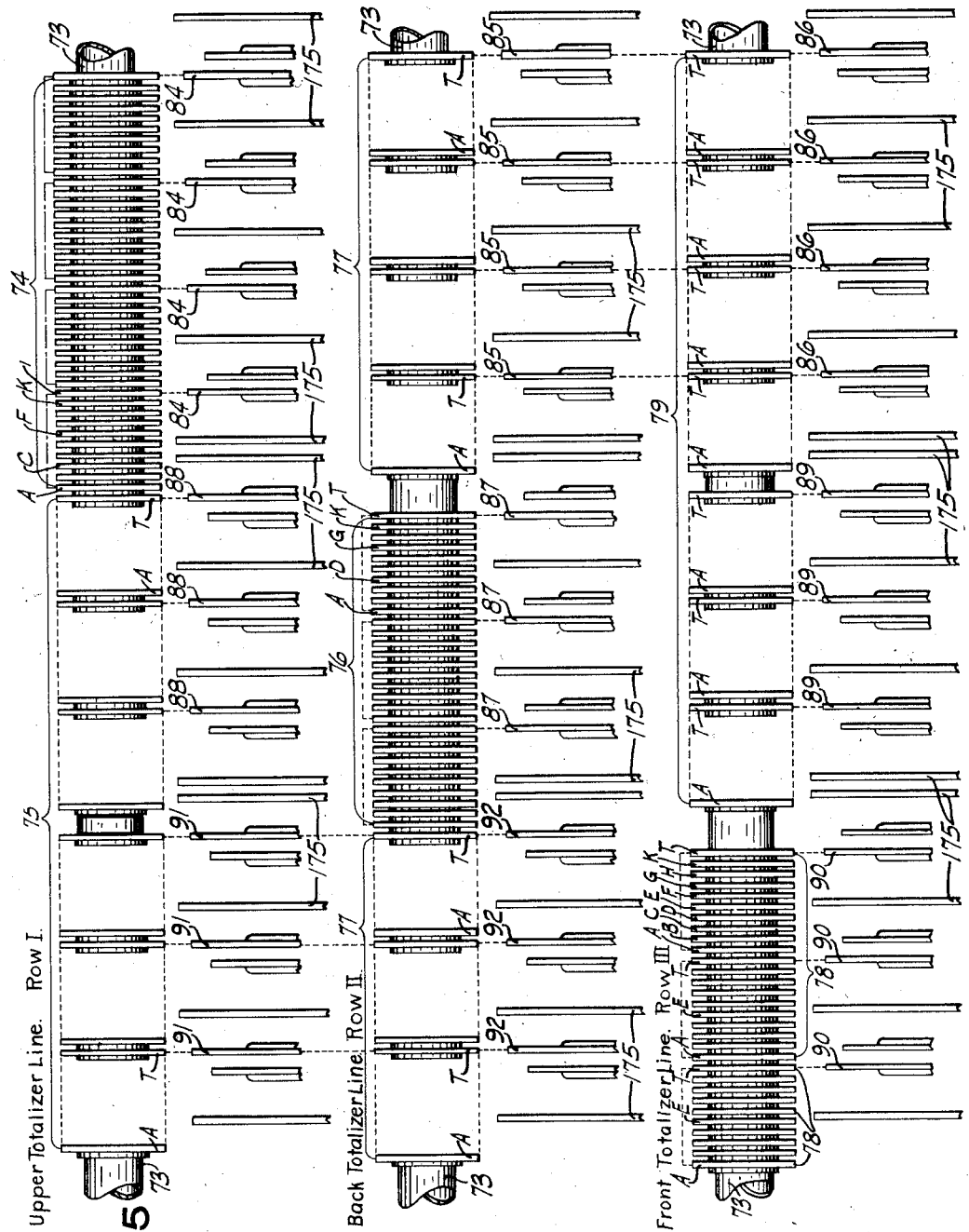

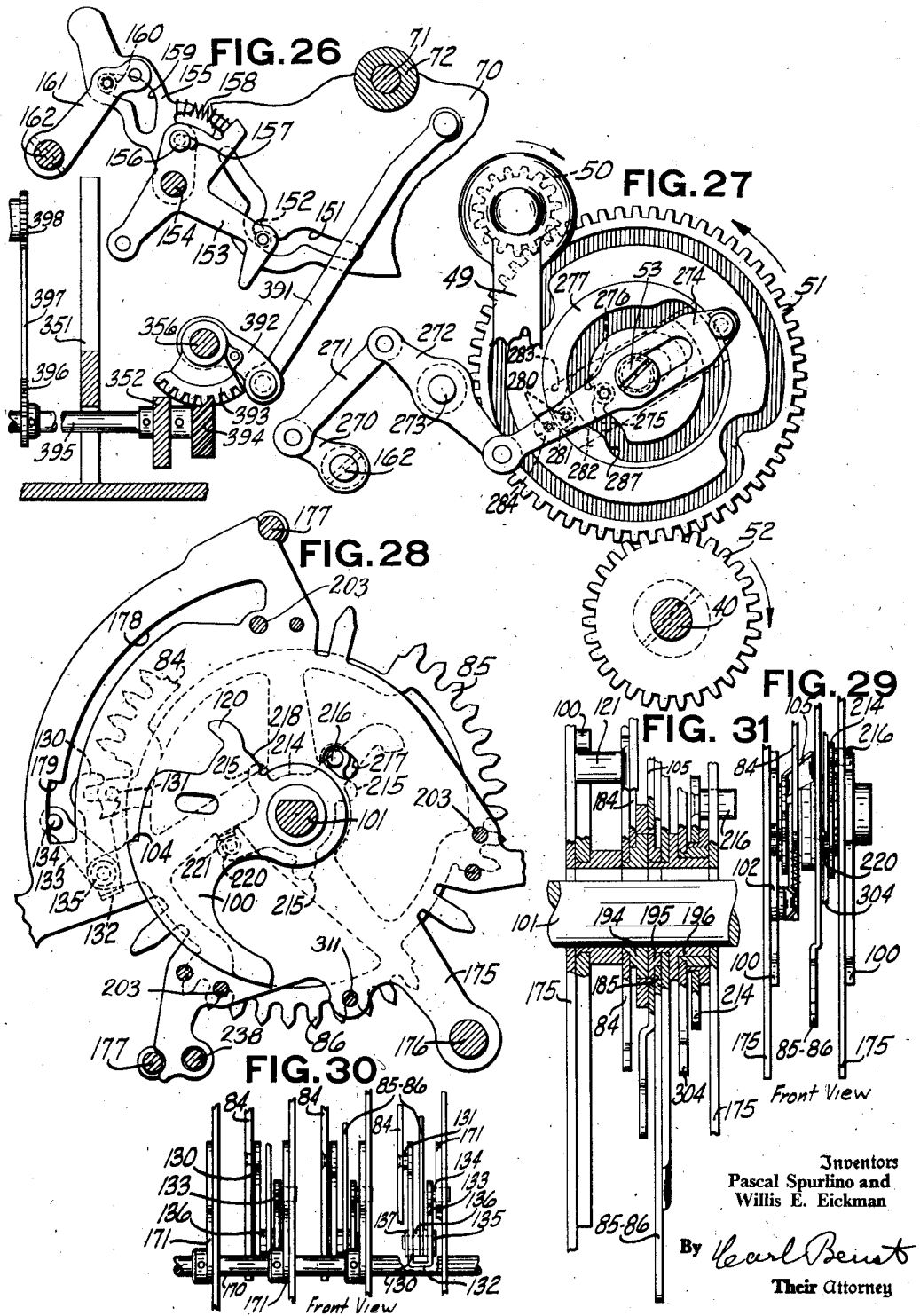

March 3, 1942.   P. SPURLINO ET AL   2,274,853
CASH REGISTER AND ACCOUNTING MACHINE
Filed April 26, 1939   8 Sheets-Sheet 8
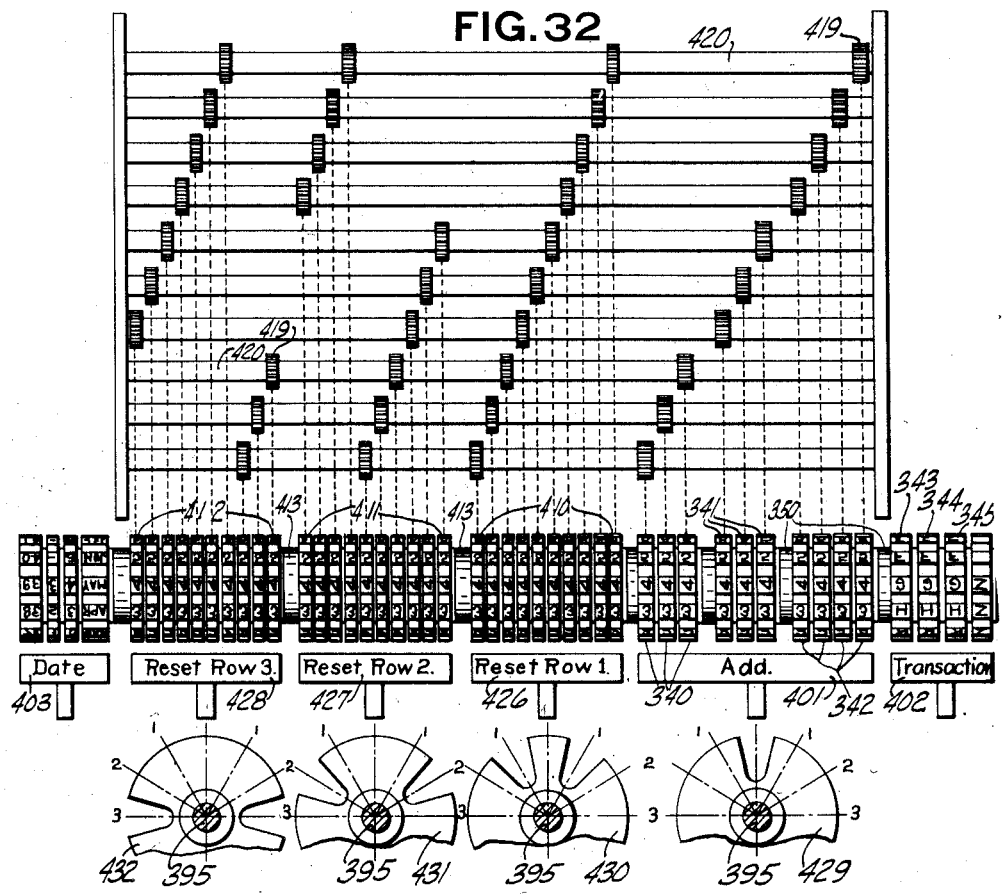
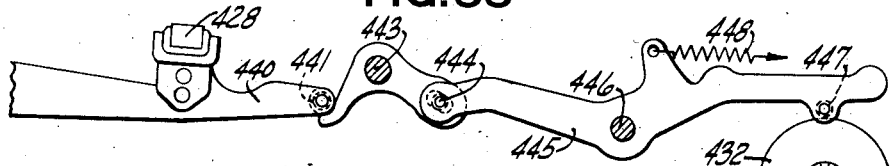
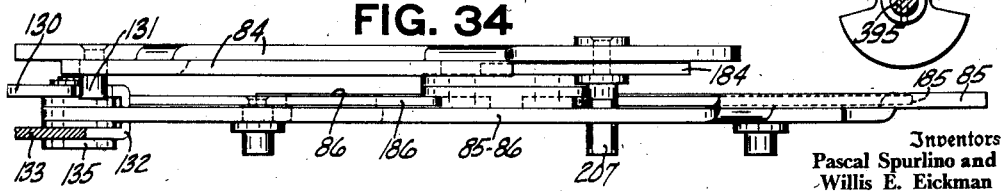
Inventors
Pascal Spurlino and
Willis E. Eickman
By *Earl Benet*
Their Attorney Patented Mar. 3, 1942

2,274,853

UNITED STATES PATENT OFFICE 2,274,853

CASH REGISTER AND ACCOUNTING MACHINE

Pascal Spurlino and Willis E. Eickman, Dayton, Ohio, assignors to The National Cash Register Company, Dayton, Ohio, a corporation of Maryland Application April 26, 1939, Serial No. 270,048

12 Claims. (Cl. 235—7)

This invention relates to cash registers and accounting machines, and more particularly to an improved type of differential mechanism and transfer mechanism especially adapted for use with what is commonly known in the art as a "split" keyboard.

Heretofore it was necessary in such types of machine to either reduce the capacity of the totalizers or increase the size of the machine in order to accommodate a split keyboard. With the present invention it is neither necessary to reduce the capacity of the totalizers nor increase the size of the machine in order to compensate for the split keyboard.

It is, therefore, an object of this invention to provide a novel differential mechanism especially adapted for use with a split keyboard.

Another object is to provide totalizers for use with a split keyboard without diminishing their capacity.

An additional object is to provide interspersed totalizers having adding wheels and overflow wheels, said overflow wheels being located adjacent the highest and lowest order adding wheels.

Another object is to provide a novel form of tens transfer mechanism for actuating the overflow wheels of the totalizers.

A further object is to provide a two-part actuator, one part being operable during both adding and total taking operations and the other part being operable only during total taking operations.

A still further object is to provide a differential mechanism comprising a main actuator normally operable during both adding and total taking operations, a secondary actuator normally inoperable, and means for coupling said secondary actuator to said main actuator during total taking operations to render said secondary actuator operable.

Another object is to provide a plurality of totalizers having adding wheels and overflow wheels, and a differential mechanism for actuating said wheels, said mechanism including a plurality of main actuators normally operable to actuate said adding wheels during both adding and total taking operations, a plurality of secondary actuators normally inoperable, and means for coupling said secondary actuators to the main actuators during total taking operations to render said secondary actuators operable to actuate said overflow wheels.

An additional object is to provide a plurality of totalizers having adding wheels and overflow wheels, and a two-part actuator therefor, one part adapted to actuate only the adding wheels of certain of said totalizers while the other part is adapted to actuate only the overflow wheels of the other totalizers.

A further object is to provide a plurality of lines of totalizers each having both adding wheels and overflow wheels; a plurality of groups of two-part actuators therefor, each two-part actuator in each of said groups comprising a main actuator normally operable to actuate the adding wheels on a corresponding totalizer line during both adding and total taking operations, a secondary actuator normally inoperable, and means for coupling said secondary actuator to said main actuator during total taking operations to render said secondary actuator operable to actuate the overflow wheels on the other totalizer lines.

Another object is to provide a split keyboard divided into a plurality of sections of amount keys, a plurality of totalizers each having a set of adding wheels corresponding to one of said sections and a set of overflow wheels in the denominations corresponding to the other of said sections of the keyboard; and a two-part actuator, one part of said actuator for actuating said adding wheels and the other part of said actuator for actuating said overflow wheels.

A further object of the present invention is the provision of three lines of interspersed totalizers each line having totalizers with accumulating wheels and overflow wheels, the accumulating wheels of each line being opposite the overflow wheels of all other lines, and totalizer actuators arranged to simultaneously add into the accumulating wheels of a totalizer on each line and simultaneously transfer into the overflow wheels of said totalizer when necessary during said simultaneous addition in said accumulating wheels.

With these and incidental objects in view, the invention includes certain novel features of construction and combinations of parts, the essential elements of which are set forth in appended claims and a preferred form or embodiment of which is hereinafter described with reference to the drawings which accompany and form part of this specification.

Of said drawings:

Fig. 1 is a diagrammatic view of the keyboard of the machine showing the split arrangement thereof.

Fig. 2 is a top plan view of the type wheels and the driving means therefor.

Fig. 3 is an enlarged detail view of the mechanism for setting the type wheels for the units order, taken on line 3—3 of Fig. 2, looking in the direction of the arrows.

Fig. 8 is a detail view of a main actuator, the driver therefor, and the differential latch for coupling said actuator to the driver.

Fig. 9 is a rear edge view of part of the mechanism shown in Fig. 8.

Fig. 10 is a detail view of one of a pair of devices for giving the drivers their constant excursion of movement during each cycle of operation of the machine.

Fig. 11 is a detail view of a differential latch and its associated driver.

Fig. 12 is a detail view of the transfer carrying mechanism shown in Fig. 5, the parts being shown in the positions they assume after transferring "1" to the next higher order totalizer wheel.

Fig. 18 is a detail view of a portion of the means for conditioning the mechanism which controls the disengagement of the differential latch by its totalizer wheel during total taking operations.

Fig. 19 is a detail view of the mechanism controlled by the totalizer wheels during total taking operations for disengaging the differential latch from its driver.

Fig. 20 is a rear view of part of the mechanism shown in Fig. 19.

Fig. 21 is a detail view showing the control by the zero stop pawl throwout shaft, of the means for conditioning the mechanism which controls the disengagement of the differential latch by the totalizer wheels, and also shows the control of the coupling between the main actuator and the secondary actuator associated therewith.

Fig. 22 is a detail view of a portion of the mechanism for arresting movement of the differential latch carrying member to effect disengagement of said latch from its driver.

Fig. 23 is a rear view of the mechanism shown in Fig. 22.

Fig. 24 is a front view of the special mechanism associated with the front line of totalizers for transferring from a totalizer wheel on the left end of the line into the next higher order totalizer wheel on the right end of the line.

Fig. 25 is a diagrammatic view of the three totalizer lines showing the particular grouping of the adding wheels and the overflow wheels thereon.

Fig. 26 is a detail view showing means controlled by the total lever for actuating the zero stop pawl throwout shaft and adjusting the "X—Z" printing wheel.

Fig. 27 is a detail view of the mechanism for conditioning the machine for two cycle operations.

Fig. 28 is a view alongside one of the hangers associated with the differential mechanism for each of the banks of keys.

Fig. 29 is a front view of a portion of the mechanism seen in Fig. 28.

Fig. 30 is a fragmentary front view showing the relation between the coupling members and their associated hangers.

Fig. 31 is an enlarged section showing the mounting of one of the differential units.

Fig. 32 is a diagrammatic view of the type wheels showing the system of connections used for transposing type wheels of the same denomination in each of the different sets of type wheels so that they will print in proper sequence, together with the printing hammers therefor.

Fig. 33 is a detail view of the selecting means for one of the printing hammers.

Fig. 34 is a top view, in enlarged scale, of the mechanism shown in Fig. 13.

GENERAL DESCRIPTION

Figure 4:
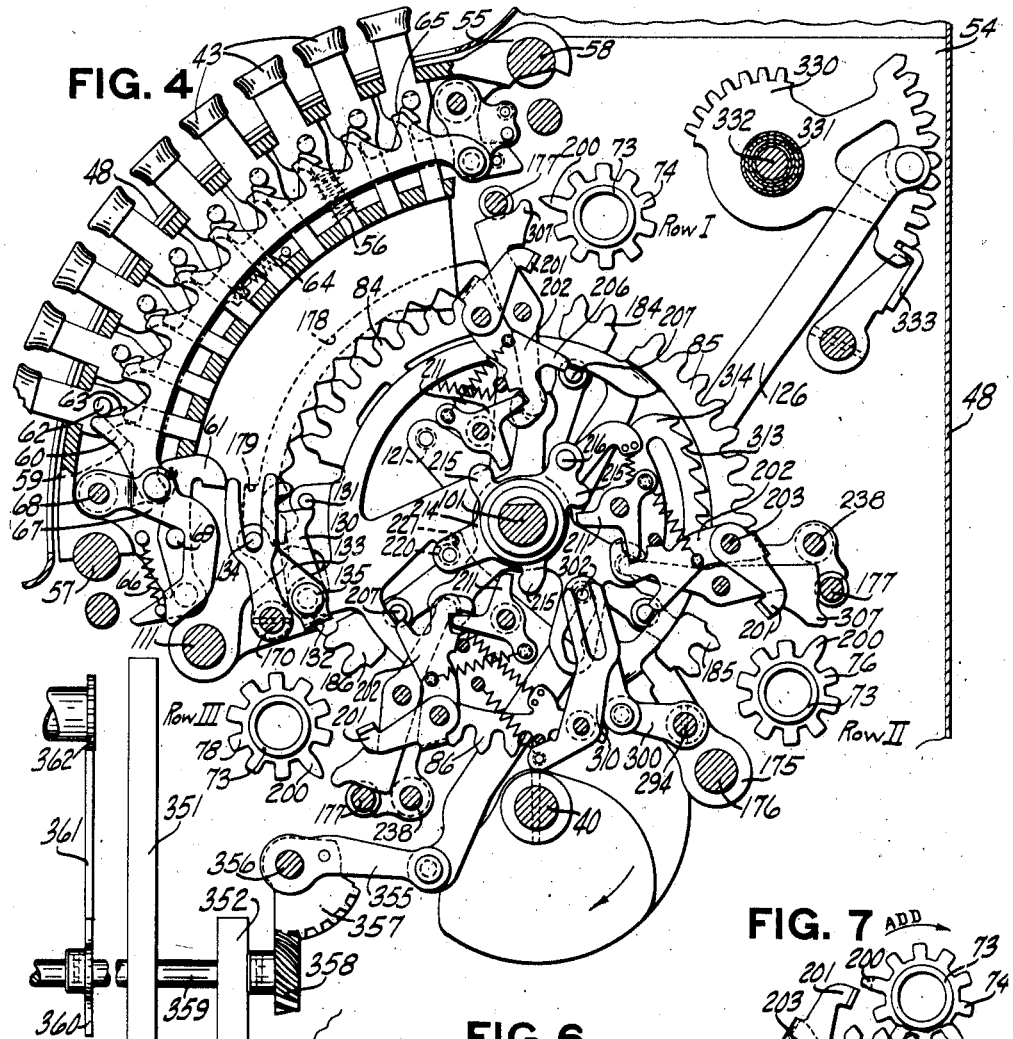
Fig. 4 is a side view of the differential mechanism for one denominational order, showing the mechanism cooperating therewith.

The machine shown in the accompanying drawings is of the general type shown and described in United States Letters Patent Nos. 1,619,796, 1,747,397 and 1,761,542, issued March 1, 1927, and Feb. 18, 1930, to B. M. Shipley, and No. 1,693,279, issued November 27, 1928, to Walter J. Kreider. Only such parts of the machine as are directly involved in the present invention are shown and described herein, as reference may be made to the above mentioned patents for any information desired as to the construction and operation of the rest of the machine.

In general, the machine herein illustrated, like those disclosed in the above mentioned patents, has three "lines" of totalizers (Fig. 25), arranged around a series of denominational adding racks or actuators controlled as to their extents of movement in adding operations by banks or rows of depressible amount keys. Such banks of amount keys are divided into three separate sections or groups to form what is commonly known in the art as a "split" keyboard. Each of said lines of totalizers is associated with a different one of said sections or groups of amount keys, and the keys in each of said sections, during adding operations, control the extent of movement of the actuators correlated therewith to add variable amounts into the totalizers on the totalizer line corresponding to that particular section of the keyboard.

The totalizers on the various totalizer lines are of the interspersed type and comprise adding wheels and overflow wheels. The adding wheels on each of said lines are grouped together in positions corresponding to the location of their related sections of the keyboard, while the overflow wheels on each of said lines are arranged in groups located in positions corresponding to the other sections of the keyboard.

For example, the adding wheels on the totalizer line corresponding to the middle or central section of the keyboard are located approximately in the middle of said line to correspond to the position of said section, whereas the overflow wheels are grouped both to the left and to the right of said adding wheels in positions corresponding to the left and right sections of the keyboard. In this particular case the overflow wheels are located adjacent the highest and lowest order adding wheels of the interspered totalizers.

A novel form of "tens" transfer mechanism is provided for actuating the overflow wheels of the totalizers, particularly when transferring from the overflow wheels adjacent the highest order adding wheels to the overflow wheels adjacent the lowest order adding wheels of said totalizers.

Such an arrangement as that just described makes it possible to employ in a machine, having a "split" keyboard, totalizers having a relatively high capacity, without the necessity of increasing the size of the machine.

The differential mechanism associated with each bank of amount keys includes a two-part actuator comprising what is hereinafter referred to as a main actuator and a secondary actuator.

The reason for having a two-part actuator, instead of the customary one piece actuator, is to prevent, during adding operations, when all three totalizer lines are simultaneously engaged with the actuators, the actuator from operating the overflow wheels on certain of the totalizer lines the same extent that it operates the adding wheels on its respective totalizer. During such operation the overflow wheels on the other totalizer lines are to be operated only by the "tens" transfer mechanism. Consequently the secondary actuator is therefore disconnected from the main actuator during adding operations so that it only participates in the differential movement of the main actuator to the extent necessary for effecting a transfer from an overflow wheel of lower denomination to the overflow wheel of next higher denomination.

The control of each main actuator by its bank or row of amount keys is accomplished by means of the usual latch mechanism with which each main actuator is provided, and which latch is caused to be disconnected from its invariable driver by a depressed key, so that the main actuator is caused to be arrested in a position corresponding to the value of the key depressed.

After the main actuators have been adjusted under control of the depressed keys, the adding wheels composing the selected totalizers on the various totalizer lines are engaged with their respective denominational main actuators, after which the main actuators are returned to their normal positions to accumulate on the selected totalizers the amounts corresponding to the values of the keys depressed in the different sections of the keyboard. The main actuators also control the adjusting of indicating mechanism, and type wheels to indicate and print amounts entered upon or taken from the various totalizer wheels.

To take a total from any of the totalizers and at the same time reset such totalizers to zero, or to take a sub-total or reading therefrom, a manually operated control or total lever is first adjusted to the proper position to select the particular totalizer "line" which carries the particular totalizer to be effected. Such adjustment of the total lever causes the secondary actuators, which are normally inoperable, to be coupled to their associated main actuators, so that each main actuator and its secondary actuator will move together as a single unit during such operation. The adding wheels and overflow wheels of the selected totalizer on the "line" selected are then engaged with their respective main and secondary actuators, respectively, and the drivers turn both of said actuators and the engaged adding wheels and overflow wheels until the latches are disconnected from the drivers under control of long teeth on the totalizer wheels as the adding wheels and overflow wheels reach zero. The long teeth of the totalizer wheels are adapted to operate a zero resetting control which, through a latch releasing mechanism, causes the latches of the various main actuators to be disconnected from their corresponding drivers as the totalizer wheels reach zero.

Three banks of totalizer selecting keys are provided, one bank for each totalizer line, for selecting the proper totalizer on its respective totalizer line. These keys also control the setting of type wheels to print characters designating the various totalizers selected, and also align indicator tablets for indicating such characters.

Such mechanism, as above described, lends itself particularly to the simultaneous setting up of three separate amounts on the keyboard, each amount being capable of an individual classification. This may take the form, in a practical embodiment, of a tabulating means for use in the main or central office of an organization operating a chain of filling stations to tabulate simultaneously the quantity of gasoline and the quantity of oil sold, together with the amount of the sales of these two combined commodities, as reported daily by each of the various stations. The totalizer selecting keys provide means for classifying each of the three amounts which are simultaneously set up on the machine.

On the other hand, such a machine may also be used in a store employing the cashier system. Such a store may have three different counters, such as a meat counter, a vegetable counter, and a staple goods counter, with each section of the keyboard being appropriate to one of said counters, and the classification keys serving to classify the amounts according to the clerks working at each of the counters. With such a system the amounts of the purchases made by a customer at the various counters could be simultaneously set up on the amount keys in the different sections of the keyboard by a cashier and the particular clerks' totalizers selected by depression of the proper totalizer selecting or transaction keys.

Detailed Description

Operating means

The present machine is actuated by a main drive shaft 40 (Fig. 4) which may be either hand or motor driven, preferably the latter. The shaft 40 receives one complete clockwise rotation during item entering or adding operations and two complete clockwise rotations during total or sub-total taking operations, as is usual in such types of machines. For a hand operation a handle 49 (Fig. 27) carries a pinion 50 meshing with a gear 51 mounted on stud 53 on the machine side frame (not shown). The gear 51 drives a gear 52 secured to the shaft 49. Two turns of the handle 49 turns the shaft 49 once.

The motor which it is desired to use in connection with the present machine is of the well known type, illustrated and described in United States Patent No. 1,144,413 granted to Charles F. Kettering and William A. Chryst on June 20, 1915. A portion of said motor is also shown in the above mentioned Shipley Patent No. 1,619,-796. For a detailed description of the motor and the mechanism for releasing the machine for operation, reference may be had to said patents.

Keyboard

As heretofore mentioned, the keyboard is divided into three separate sections or groups of amount keys 41, 42, and 43 (Fig. 1). Separate amounts may be simultaneously set up on each of the different groups of amount keys and such amounts will be separately added into totalizers on totalizer lines corresponding to the different groups of amount keys. Such keys also control the setting of printing mechanism to print the amounts added into the totalizers, as will be hereafter described in detail.

In addition to the three groups of amounts keys 41, 42, and 43, there are three rows or banks of totalizer selecting keys 44, 45, and 46, there being as many rows of such keys as there are totalizer lines, and as many keys in each bank or row as there are totalizers in the respective "lines." These keys control the selection of the proper totalizers on the various totalizer lines. For instance, the transaction keys 44 control the selection of the totalizers on the front totalizer line (Fig. 25) which corresponds to the group of amount keys 41. The keys 45 control the totalizers on the back totalizer line which are associated with the group of amount keys 42, and the keys 46 control the totalizers on the upper totalizer line which are associated with the group of amount keys 43. These keys also set printing mechanism to print characters designating the various totalizers as will be fully explained in connection with the printing mechanism.

A total lever 47 is employed for conditioning the machine in the usual manner for sub-total taking or read operations and grand total taking or totalizer resetting operations. This lever also adjusts an "X—Z" printing wheel and controls the operation of the printing hammers for taking impressions from the different sets of printing wheels, as will be more fully described hereinafter.

The entire machine is enclosed by a cabinet or casing 48, shown partly in Fig. 4.

Amount keys

As illustrated herein, there are ten banks of amount keys which as above stated are divided into three separate groups, viz., the keys 41, 42 and 43. The construction and operation of each of these banks of keys are substantially the same as the banks of amount keys shown and described in the heretofore mentioned Shipley Patent 1,619,796 and, therefore, but a brief description thereof will be given herein.

Inasmuch as each of the banks of amount keys in the present machine are identically alike, a brief description of one of the banks of keys 43 will suffice for all. The keys 43 of the amount bank to be thus described are mounted in an individual frame 55 (Fig. 4) and each is normally held in an undepressed position by a coiled spring 56. The frame 55 is carried by cross rods 57 and 58 supported by the machine side frames 54 (only one being shown). Any one of the keys 43, when depressed, coacts in an old and well known manner with a detent 59 to lock said key in its depressed position and with a control bar 60 to render a zero stop pawl 61 ineffective.

Each key 43 carries a stud 62 which coacts with a hook 63 on the detent 59 whereby a depressed key may be held depressed under the action of a spring 64.

Depression of another key in the same bank releases any other depressed key in that bank and is itself held depressed by its hook 63.

Also when a key 43 is depressed the stud 62 coacts with an associated finger 65 on the control bar 60 to move said bar downwardly against the action of a spring 66. The bar 60 at its lower end is pivoted to an arm 67 mounted on a stud 68 in the frame 55 and upon such downward movement rocks the arm 67 clockwise whereupon it coacts with a stud 69 on the zero stop pawl 61 and rocks the latter out of its effective position. When said depressed key 43 is released and returned to its normal undepressed position, the spring 66 returns the zero stop pawl 61, arm 67 and bar 60 to their home positions. The construction and function of the zero stop pawl 61 will be described more fully hereinafter in connection with the transfer mechanism.

Transaction keys

The three banks or rows of transaction keys 44, 45 and 46 (Fig. 1) are used to control mechanism for effecting the proper selection of the various totalizers. For instance, the keys 44 (Fig. 25) control the selection of the totalizers on the front totalizer line designated as row III (Fig. 25), the keys 45, the control totalizers on the back totalizer line or row II, and the keys 46 the control totalizers on the upper totalizer line or row I. Since the construction and function of such keys and the mechanism controlled thereby are old and well known in the art, as disclosed by the aforesaid Shipley Patent No. 1,619,796, no showing or description thereof is thought necessary herein.

Total lever

The function of the total lever 47 (Fig. 1) is to control mechanism for conditioning the machine for sub-total taking or reading operations and total taking or resetting operations. In addition, the lever 47 controls the selection of the various totalizer lines for engagement with the differential actuators. The mechanisms for accomplishing such results are shown and described in the before mentioned Shipley Patent No. 1,619,796 and therefore are not shown or described in detail herein.

The total lever 47 also controls the selection of the various printing hammers for operation during the different kinds of operation of the machine. This latter mechanism will be described hereinafter in connection with the printing mechanism.

The lever 47 (Fig. 1) is formed integral with a nearly circular plate 70 (Fig. 26) loose on a sleeve 72 surrounding a rod 71 mounted in the machine in an old and well known manner, as disclosed in said Shipley Patent No. 1,619,796.

Totalizers

The totalizers in the illustrated machine are of the interspersed type and are arranged on three separate totalizer "lines" (Fig. 25). The upper totalizer line, designated row I in the drawings, is associated with the four banks of amount keys 43; the back totalizer line, designated row II, is associated with the three banks of amount keys 42; while the front totalizer, designated row III, is associated with the three banks of amount keys 41.

Each "line" of totalizers is formed of a plurality of denominational adding wheels and overflow wheels journaled independently of each other on a tube or "line" 73. Adding wheels and overflow wheels of the same denomination are grouped together, there being a group of "units" adding wheels, a group of "tens" adding wheels, and so on, on each totalizer line. The first adding wheel of the "units" group, the first adding wheel of the "tens" group, and so on, represent one totalizer of a totalizer "line"; the second adding wheel in the group of "units" wheels, the second adding wheel in the group of "tens" wheels, and so on, constitute a second totalizer on the same tube or "line." Hence, there are as many totalizers on one "totalizer line" as there are individual adding wheels in the "units" group of adding wheels.

More specifically, there are ten totalizers arranged on the upper totalizer line (Fig. 25), which totalizers include four denominational groups of adding wheels 74 and six denominational groups of overflow wheels 75. Likewise, there are ten totalizers arranged on the back totalizer line which totalizers include three denominational groups of adding wheels 76 and seven denominational groups of overflow wheels 77. In the latter case the overflow wheels are located adjacent both the highest and lowest order adding wheels. There are also ten totalizers on the front totalizer line which include three denominational groups of adding wheels 78 and seven denominational groups of overflow wheels 79. The last mentioned overflow wheels are located adjacent the lowest order adding wheels 78.

The construction and function of the totalizer adding wheels and overflow wheels are fully shown and described in the aforesaid Shipley Patent No. 1,619,796, and reference may be had to such patent for a thorough understanding of the same.

Totalizer selecting and engaging mechanism

The mechanism for selecting, under the control of the totalizer selecting keys 44, 45 and 46, and engaging the totalizers with their respective actuators is not shown in the accompanying drawings, but any suitable mechanism, such as that disclosed in the last mentioned Shipley patent, may be employed. Such mechanism is adjusted so that it will engage simultaneously all three lines of totalizers with the actuators during adding operations, and only one of said totalizer lines at a time during subtotal or grand total taking operations.

DIFFERENTIAL MECHANISM

The differential mechanism of the machine is employed to differentially operate the different totalizers and to select them for operation, and also to set type carriers in the printing mechanism and aline indicators. The amount differential mechanism will now be described.

AMOUNT DIFFERENTIAL UNITS

There is one complete differential unit for each bank of amount keys (Figs. 1 and 25) and each unit includes a main actuator and a secondary actuator. The main actuators operate during adding operations to add on the totalizer wheels 74, 76, and 78; during reset operations to turn said wheels to zero, and during read operations to turn said wheels to zero and afterwards return those wheels to the positions they were in before such reading operation. The secondary actuators operate only during read and reset operations, and then only upon the overflow wheels 75, 77, and 79 of the various totalizers. The differential unit (Fig. 13), which includes a main actuator 84 and a secondary actuator comprised of racks 85 and 86, is illustrative of each of the units associated with the group of amount keys 43. In the differential units associated with such group of keys the main actuators 84 are disposed in cooperative relation with the totalizer adding wheels 74 (Fig. 25) on the upper totalizer line. The racks 85 of the secondary actuators 85—86 are disposed in cooperative relation with the four highest order overflow totalizer wheels 77 on the back totalizer line, and the racks 86 of the secondary actuators 85—86 are in cooperative relation with the four lowest order overflow totalizer wheels 79 on the front totalizer line.

Figure 14:
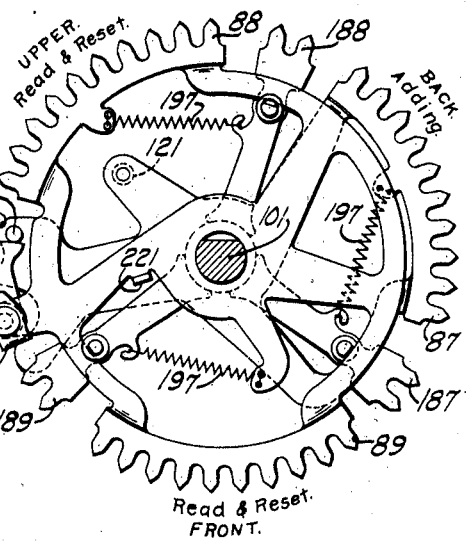
Fig. 14 is a detail view of a main actuator for actuating adding wheels on the back totalizer line and a secondary actuator connectable thereto for actuating overflow wheels on the other two totalizer lines.

The differential unit shown in Fig. 14, which includes a main actuator 87 and a secondary actuator comprised of racks 88 and 89, is illustrative of each of the units associated with the amount keys 42. In the differential units associated with this group of keys the main actuators 87 are disposed in cooperative relation with the totalizer adding wheels 76 (Fig. 25) on the back totalizer line. The racks 88 of the secondary actuators 88—89 are in cooperative relation with the three lowest order overflow totalizer wheels 75 on the upper totalizer line, and the racks 89 of the secondary actuators 88—89 are in cooperative relationship with the three highest order overflow wheels 79 on the front totalizer line.

Figure 15:
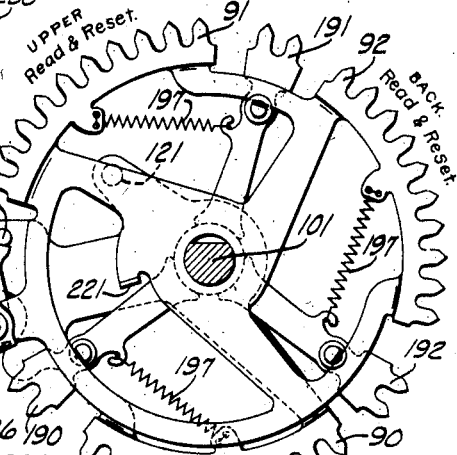
Fig. 15 is a detail view of a main actuator for actuating adding wheels on the front totalizer line and a secondary actuator connectable thereto for actuating overflow wheels on the other two totalizer lines.

The differential unit shown in Fig. 15, which includes a main actuator 90 and a secondary actuator comprised of racks 91 and 92, is illustrative of each of the units associated with the amount keys 41. In these differential units the main actuators 90 are disposed in cooperative relation with the totalizer adding wheels 78 on the front totalizer line. The racks 91 of the secondary actuators 91—92 are disposed in cooperative relation with the three highest order overflow wheels 75 on the upper totalizer line, and the racks 92 of the secondary actuators 91—92 are in cooperative relation with the three lowest order overflow wheels 77 on the back totalizer line.

The construction of each of the differential units associated with the various banks of amount keys is substantially the same, the only difference being in the positions of the main and secondary actuators with relation to the different totalizer lines, and for this reason it is thought sufficient to describe in detail only one of said units. Accordingly, a unit associated with one of the banks of amount keys 43 will now be described.

The main actuator 84 (Figs. 4, 13, 31 and 34) and the secondary actuator 85—86 of this differential unit are both loosely mounted on a shaft 101 journaled at its ends in the side frames 54 of the machine. The main actuator 84 is formed with a toothed rack for coacting with totalizer adding wheels 74 on the upper totalizer line during adding operations while the secondary actuator has, as above stated, two racks 85 and 86, rack 85 coacting with the four highest order totalizer overflow wheels 77 on the back totalizer line and rack 86 coacting with the four lowest order overflow wheels 79 on the front totalizer line, during total taking operations. As heretofore mentioned, the main actuator 84 is operable during both adding and total taking operations, while the secondary actuator 85—86 is operable only during total taking operations.

*Differential mechanism—adding operations*

The main actuators 84, 87 and 90 are each driven by a separate driving segment 100 (Fig. 11) secured to the shaft 101. The shaft 101 and segments 100 are given an invariable movement first clockwise and then counter-clockwise during each cycle of operation of the machine by means hereinafter described The driving connections between each of the actuators 84, 87 and 90 and their associated driving segments 101 are identically the same and therefore a description of the connections between one of the actuators 84 and its associated driving segment 100 will suffice for all.

A latch 102 (Figs. 8 and 11) pivotally mounted on the actuator 84 is constantly urged in a clockwise direction by a spring 103 to engage said latch with a shoulder 104 on the driving segment 100. The actuator 84 is, through such latch connection, carried with the segment 100 on its clockwise movement until the forward end of an arm 105 pivoted on the shaft 101 strikes the stem of a depressed amount key 43. When this occurs, a diagonal slot 106 in the arm 105, through which slot projects a stud 107 on the latch 102, disengages said latch from the shoulder 104 and causes the latch to ride idly on the periphery of said segment 100 during the remainder of its clockwise movement. When the latch 102 is thus disengaged from the segment 100 a projection 108 on said latch engages one of a series of notches 109 in a plate 110 mounted on a rod 111 and secured to the differential hanger 175, later described. This arrests the clockwise movement of the actuator 84 and retains it in a position corresponding to the value of the key 43 which has been depressed.

Before the counter-clockwise movement of the segments 100, the selected totalizers are moved simultaneously into engagement with their respective main actuators 84, 87 and 90 in a manner old and well known in the art, as disclosed in the above mentioned Shipley Patent No. 1,619,796. As the segments 100 are moved counter-clockwise, fingers 120 (Fig. 8) thereon coacting with studs 121 on the actuators 84, 87 and 90 will restore said actuators to their normal positions to add upon the selected totalizer wheels, amounts represented by the depressed keys 41, 42 and 43.

The means for imparting the invariable movement to the driving segments 100 includes two pairs of cams 112 and 113 (Fig. 10), only one of said pairs being shown, secured to the main drive shaft 40. Each pair of said cams is disposed near opposite ends of the shaft 40 to prevent excessive torsional strain on the shaft 101. Since both of these two pairs of cams and their connections for driving the segments 100 are iden- tically alike, a description of the pair herein illustrated will suffice for both.

During each cycle of operation of the machine, as hereinbefore mentioned, the shaft 40 and cams 112 and 113 receive one complete rotation in a clockwise direction, whereupon the cams 112 and 113 coacting with a pair of rollers 114 and 115 carried by a lever 116, rock the latter first clockwise and then counter-clockwise. Such clockwise and counter-clockwise movements of the lever 116 are, through a link 117 connecting the latter with an arm 118 secured to the shaft 101, likewise imparted to the shaft 101 and the driving segments 100 secured thereon.

Each of the main actuators 84, 87 and 90 has pivoted thereto at 119 a beam 122 (Fig. 8) bifurcated to embrace a stud 123 on a link 124. As each of said actuators is differentially positioned under control of a depressed amount key, the forward end of the beam 122 will likewise be positioned. Each of the beams 122 (Fig. 8) is operated by a roller 125 on a link 126 pivoted at one end to the hanger 175 and connected at its opposite end to the driving segment 100 by a stud 127 (Fig. 11) projecting through an aperture 128 in said segment.

The forward end of the link 126 is thereby moved clockwise with its associated driving segment 100, whereupon the roller 125 contacts the underside of the beam 122 and moves the bifurcated end of the beam 122 and the link 124 to a position corresponding to the position of the actuator. The link 122 is connected to and adjusts indicating mechanism and type wheels a like extent, as will be more fully described hereinafter.

*Secondary actuator and its coupling means*

A description of the construction and operation of the secondary actuator 85—86 associated with the main actuator 84 just described will also suffice for all of the secondary actuators 85—86, 88—89 and 91—92. Since the actuator 85—86 coacts with only overflow wheels 72 and 79 on the back totalizer line and the front totalizer line (Fig. 25) during total taking operations, it is therefore desirable not to have said actuator operate during adding operations.

For this purpose, instead of having the usual single actuating member, there are provided the main actuator 84, which is operable during both adding operations and total taking operations, and the secondary actuator 85—86, which is operable during total taking operations. Means is provided, under control of the total lever 47, for coupling the secondary actuator 85—86 to the main actuator 84 during total taking operations to render said secondary actuator operable therewith. During such total taking operation, the secondary actuator 85—86 functions in the same manner as the main actuator 84 to actuate its associated overflow wheels.

To couple the secondary actuator 85—86 to the main actuator 84, a coupling hook 130 (Figs. 4, 13, 14, 15, 19, and 30) on the secondary actuator is moved into engagement with a stud 131 on the main actuators 84. This hook 130 is connected by a bail 132 to an arm 133 carrying a stud 134. The hook 130 and arm 133 are pivoted on a headed stud 135 supported by a hub 136 in the secondary actuator 85—86 (Fig. 30). A clip 137 engages a groove in the stud 135 and holds the hook 130 and arm 133 in place so that they are free to be rocked by means to be later described, to couple the secondary actuator 85—86 to the main actuator 84. The means by which the total lever 47 rocks the hook 130 and arm 133 to couple the secondary actuator 85—86 to the main actuator 84 during total taking operations will now be described.

Whenever the total lever 47 is moved either upwardly or downwardly for sub-total taking operations or grand total taking operations, respectively, a slot 151 in the total lever plate 70 (Fig. 26) coacts with a stud 152 on a lever 153 to rock the latter counter-clockwise on its pivot 154. Also pivotally mounted at 154 is another lever 155 carrying a stud 156 which projects into a slot 157 in the lever 153. A spring 158, compressed between extensions on the levers 153 and 155, serves to hold them in the positions shown in Fig. 26. When the lever 153 is rocked counter-clockwise as above mentioned, the spring 158 acts to impart a like movement to the lever 155. Formed in the lever 155 is a cam slot 159 which, during such counter-clockwise movement of said lever, coacts with a pin 160 on an arm 161 secured to a shaft 162 to rock said arm and shaft clockwise. The shaft 162 has secured thereon an arm 166 (Fig. 21) carrying a stud 167 which coacts with a cam slot 168 in an arm 169 secured to a shaft 170 suitably mounted in the machine. Thus, clockwise movement of the shaft 162 will, through the stud 167 and slot 168, rock the shaft 170 clockwise.

The shaft 170 has fast thereon a series of arms 171 (Figs. 4 and 19), one for each coupling hook 130, each of said arms being bifurcated at its upper end to embrace the previously described stud 134 on the arm 133 of its associated coupling hook 130. Therefore, when the shaft 170 receives the clockwise movement mentioned above, it will, through the engagement of the arm 171 with the stud 134, rock the coupling hook 130 into engagement with the stud 131, thereby coupling the secondary actuator 85—86 to the main actuator 84 so that they will move in unison during total taking operations.

Each differential unit has associated therewith a separate hanger 175 (Figs. 25 and 28) for supporting certain mechanism which is related to said unit. There is also an additional one of said hangers located between each of the different groups of differential units associated with the various sections of the keyboard (Fig. 25), for the purpose of supporting transfer mechanism and maintaining the proper spacing between the various differential units. The hangers 175 are mounted on the rod 111 and a rod 176, carried by the machine side frames 54, and held in their proper positions by grooved rods 177 also carried by the machine side frames 54.

The hanger associated with each differential unit is provided with a slot 178 through which projects the stud 134 of its associated coupling hook 130. The purpose of this slot 178 is to maintain the coupling hook 130 in engagement with its associated stud 131 during total taking operations, so that both the main actuator 84 and the secondary actuator 85—86 will move in unison. The lower portion of the slot 178 is wider than the upper portion thereof in order to form a shoulder 179 which coacts with the studs 134 to prevent the secondary actuator 85—86 from being moved clockwise beyond its zero position during adding operations at the time the secondary actuator is moved into position for effecting carries, as will be more fully explained hereinafter in connection with the transfer mechanism.

From the foregoing description it will be understood that during total taking operations the main actuators 84, 87 and 90 and the secondary actuators 85—86, 88—89 and 91—92 of each differential unit are coupled together and function as a single actuating member.

TRANSFER MECHANISM

*In General*

From the previous description it is clear that there are three groups of totalizer actuators, each actuator of each group including a main actuator with a single track and a secondary actuator with two racks.

For the purpose of "carrying" or transferring from the lower to higher orders each of the above mentioned racks has associated therewith a transfer arm. In other words each main actuator has one transfer arm and each secondary actuator has two transfer arms. Each transfer arm lies in the same plane as its associated actuator rack and is provided with two teeth like those of the racks.

On the upper totalizer line (Fig. 25) transfers are all from the right towards the left in the wheels 74 and in their associated overflow wheels 75.

On the back totalizer line, transfers are from the right towards the left in the wheels 76 and into the first three lower order wheels 77, however from the third overflow wheel 77 to the fourth overflow wheel 77 the transfer is from the left to the right, that is, from the left-hand overflow wheel 77 of totalizer T to the right-hand overflow wheel 77 of totalizer T. From this right-hand wheel 77 the transfers to the remaining three orders of overflow wheels 77 continue towards the left.

On the front totalizer line the transfers are from the right towards the left in the wheels 78, and from the left-hand wheel 78 of totalizer T to the right-hand overflow wheel 79 of totalizer T. From this overflow wheel 79 the transfers continue towards the left for the remaining overflow wheels 79.

Therefore, when a totalizer wheel passes from "9" to "0" the associated transfer arm causes "1" to be added upon the totalizer wheel of next higher order, whether the latter wheel be to the right or left of the former wheel.

Due to the fact that there are several different transferring conditions to deal with, and so that the several transfer arms associated with the several different actuator units can be easily distinguished, each transfer arm will be given a different number.

Figure 13:
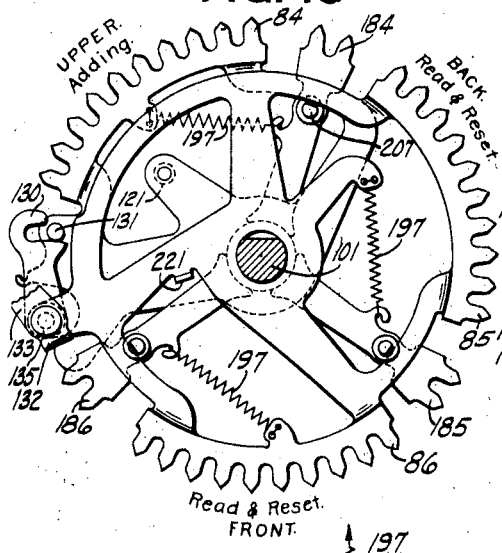
Fig. 13 is a detail view of a main actuator for actuating adding wheels on the upper totalizer line and a secondary actuator connectable thereto for actuating overflow wheels on the other two totalizer lines.

Figs. 13, 14, and 15 show one actuator unit from each of the three groups of totalizer actuators. In Fig. 13 there is a transfer arm 184 associated with the main actuator 84, and transfer arms 185 and 186 associated with the racks 85 and 86 respectively of the secondary actuator. Arms 184 cooperate with the wheels 74 of the upper totalizer line; arms 185 cooperate with the four highest order overflow wheels 77 of the back totalizer line and arms 186 cooperate with the four lowest order overflow wheels 79 of the front totalizer line.

In Fig. 14 there is a transfer arm 187 associated with the main actuator 87, and transfer arms 188 and 189 associated with the racks 88 and 89 respectively of the secondary actuator. Arms 187 cooperate with the wheels 76 of the back totalizer line; arms 188 cooperate with the three lowest order overflow wheels 75 of the upper totalizer line and arms 189 cooperate with the three highest order overflow wheels 79 of the front totalizer line.

In Fig. 15 there is a transfer arm 190 associated with the main actuator 90, and transfer arms 191 and 192 associated with the racks 91 and 92 respectively of the secondary actuator. Arms 190 cooperate with the totalizer wheels 73 of the front totalizer line, arms 191 cooperate with the three highest order overflow wheels 75 of the upper totalizer line and arms 192 cooperate with the three lowest order overflow wheels 77 of the back totalizer line.

All of the transfer arms 184, 187, and 190 (Figs. 13, 14, and 15) are mounted on hubs 194 (Fig. 31) of their associated main actuators 84, 87, and 90 and are in the plane of the racks of said actuators. Likewise all of the transfer arms 185, 186, 188, 189, 191, and 192, are mounted on collars 195 secured to hubs 196 of their associated secondary actuators and are in the plane of the racks of said actuators. Springs 197 connected to the various transfer arms and their associated main and secondary actuators, as the case may be, retain said transfer arms in their normal positions, and also actuate said arms to turn in a transfer of "1" when necessary as will be hereinafter described.

*Transfer mechanism upper totalizer line*

Since the transfer mechanisms associated with the transfer arms 184, 188, and 191 (Figs. 13, 14, and 15) for the upper totalizer line are substantially the same, a description of one of said mechanisms will suffice for all.

Referring now particularly to Figs. 5, 6, 7, and 12, the transfer mechanism associated with the transfer arm 184 will be described in detail. Each totalizer wheel 74 has a long tooth 200 which, as said wheel passes from "9" to "0" during adding operations, strikes a transfer pawl 201 pivoted on the hanger 175 and rocks said pawl counter-clockwise. The pawl 201 is yoked to another pawl 202. The yoke connecting these two pawls passes through an opening 178 in the hanger 175. By referring particularly to Fig. 6 this yoke construction is clearly shown whereby the pawl 201 is in cooperative relation with the left-hand one of the totalizer wheels 74 (shown in this figure) and the pawl 202 is located so that a finger 206 thereon normally abuts a stud 207 carried by the transfer arm 184 associated with the totalizer wheel 74 of next higher denominational order. The stud 207 is mounted in the arm 184 by the aid of a collar 208 having a flattened tenon 209 just slightly wider than the thickness of the main actuator 84. Such construction guides the outer end of the arm 184 to keep it in perfect alinement with its associated totalizer wheel 74. The other or inner end of the arm 184 is guided by the flange of the hub 194 (Fig. 31). The finger 206 contacting the stud 207 normally holds the transfer arm 184 against the action of its spring 197 in a position whereby a gap is created between said arm 184 and its associated actuator 84, when said actuator is returned to its normal position, which normal position is substantially two units of movement below its zero position as has been fully illustrated and described in the previously mentioned Shipley Patent No. 1,619,796.

However, when the pawl 201 is rocked counter-clockwise by the long tooth 200 as above described, the finger 206 is removed from the stud 207 whereupon a spring 210 rocks a pawl 211, pivoted on a stud 212 in the hanger 175, clockwise and causes it to engage a shoulder 213 on the pawl 202 and retain said pawl in its moved position whereby the finger 206 is out of the path of movement on the transfer arm 184. This permits the spring 197 to rock the arm 184 counter-clockwise to close the gap between said arm and its associated actuator 84. With the parts in these positions the actuator 84 and the transfer arm 184 constitute a single uninterrupted rack and upon the counter-clockwise return of said actuator (then meshing with its respective totalizer wheel) to its home position, the transfer arm 184 will receive an extra step of movement to turn its associated totalizer wheel 74 (the one at the right, Fig. 6) one step of movement to turn in the transfer, or in other words to add "1" to that wheel due to the fact that the next lower order wheel (the left-hand wheel 74 in Fig. 6) passed from "9" to "0".

Figures 5, 6:
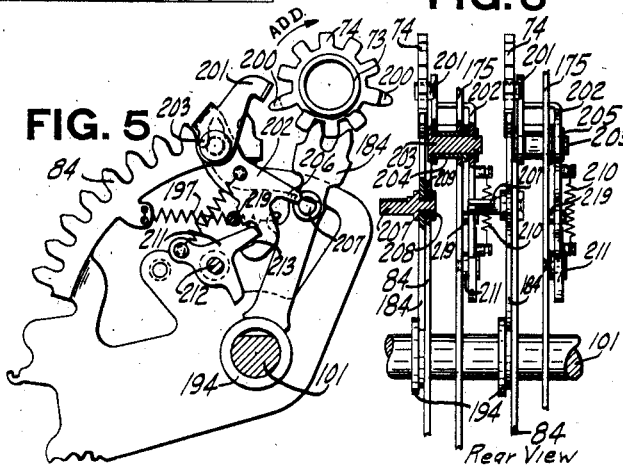
Fig. 5 is a detail view of the transfer mechanism associated with one of the main actuators, showing said mechanism in its normal position.
Fig. 6 is a rear view of the transfer mechanism shown in connection with two denominational orders of the totalizer.
Figure 7:
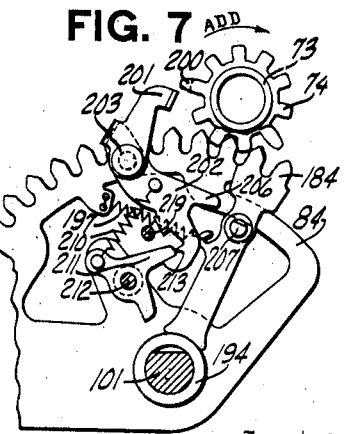
Fig. 7 is a detail view of the transfer mechanism shown in Fig. 5, with the parts shown in a position ready to turn in a transfer.

There is another transfer or carry condition in the present machine which may take effect at a different time. For example, let us now assume that the left-hand wheel 74 of Fig. 6 is the wheel into which the transfer has just been made by its associated transfer arm 184 and that just prior to this transfer operation said wheel 74 stood at "9" so that the transferring of "1" into said wheel caused it to be moved from "9" to "0". In such case its long tooth 200 rocks the pawl 201 and trips the finger 206 from the stud 207 of the transfer arm 184 associated with the wheel 74 of next higher order (the one at the right in Fig. 6). When this occurs the spring 197 immediately rocks such arm 184 from the position shown in Fig. 5 to that shown in Fig. 12 thus immediately adding "1" to the totalizer wheel 74 with which it is in engagement, which wheel is of the next higher denomination than that which caused the pawl 202 to be tripped from the stud 207. This is known in the art as transfer on a transfer.

The transfer arms 188 (Fig. 14) and 191 (Fig. 15) for the overflow wheels 75 of the upper totalizer line are controlled and operate like the transfer arms 184 when a transfer into any of said overflow wheels is necessary. It will be understood from Fig. 25 that a transfer into the lowest order overflow wheel 75 is effected by the highest order wheel 74 and its associated transfer arm 184. It might be well to state here that due to the fact that the secondary actuator racks 88 and 91 do not add into the overflow wheels 75, all transfers into said wheels above the lowest order thereof are effected directly by the springs 197 actuating the transfer arms 188 and 191.

*Transfer mechanism restoring means*

The transfer mechanism for the upper totalizer line, including the transfer arms and the transfer trip pawls, is restored to its normal position by a restoring spider 214 (Figs. 4, 28, 29, and 31) during the operation of the machine immediately subsequent to an operation in which a transfer has been made. This spider is freely mounted on the hub 199, later described, and has three arms 215, one for each of the transfer mechanisms associated with the differential unit. The spider 214 carries a stud 216 projecting through an opening 217 in the hanger 175 into the path of the driving segment 100 of the next lower order, so that, as said segment 100 approaches the end of its clockwise movement, during the operation immediately following one in which any transfer has taken place, a surface 218 thereon strikes the stud 216 and rocks the spider 214 clockwise. The arm 215 on the spider 214 rocks the pawl 211 (Figs. 4 and 7) counter-clockwise to disengage the latter from the shoulder 213 on the pawl 202, whereupon the spring 210 rocks the pawl 202 clockwise, so that the shoulder 213 is beyond the end of the pawl 211, and the finger 206 lies in the path of the stud 207 on the transfer arm 184.

The pawl 202 associated with the main actuator can move clockwise as just described because the transfer segment, together with its stud 207, is moved out of the path of the pawl 202 by the driving segment 100 at the beginning of the machine operation and before the driving segment 100 moves the spider 214. The movement of the main actuator may be arrested by the zero stop pawl or by a depressed key. In either event the movement thereof is sufficient to free the pawl 202 for movement into the path of the stud 207 before the transfer segment and actuator are returned to the normal positions shown in Fig. 4.

In those differential units in which no transfer has taken place, the springs 197 are under their normal transferring tension, and, therefore, when the stud 131 is withdrawn from contact with the arm 130, the springs 197 cause the secondary actuators to follow the main actuators until the secondary actuators reach their zero positions, in which positions they are stopped when the stud 134 contacts the shoulder 179. However, since no transfer pawls were tripped during the previous operation, the operation of the spider under those circumstances is an idle one.

In the differential units wherein a transfer pawl 202 associated with a secondary actuator has been tripped, the secondary actuator must be given a movement to zero position by other means to enable the transfer pawl 202 to be restored to normal position. To obtain this result the spider 214 is provided with a stud 220 to engage the flange 221. During the clockwise movement of the spider 214, the stud 220 thereon contacts the flange 221 on the secondary actuator 85—86 associated with the differential unit of next higher order, and rocks said secondary actuator clockwise an extent sufficient to move the said actuator into the zero position. This movement carries the transfer arm 184 clockwise from the normal position into a position wherein the stud 207 passes beyond the end 206 of pawl 202, at which time the spring 210 rocks the pawl 202 clockwise to position its finger in front of the stud 207. The secondary actuator 85—86 is moved by the spider 214 an extent sufficient to bring the stud 134 into contact with the shoulder 179 (Fig. 28) of the hanger 175, which, as pointed out above, corresponds to the zero position of the actuator.

As the main actuator 84 nears its home position, stud 131, by its contact with the arm 130, rocks the secondary actuator 85—86 counter-clockwise to its home position, whereupon the flange 221 contacts the stud 220 and rocks the spider 214 to its home position.

There is a flange 221 on each of the secondary actuators 88—89 and 91—92 to cooperate with and return the transfer restoring spiders 214 and their associated transfer arms to their normal positions.

*Transfer mechanism front totalizer line*

As previously stated, each totalizer line consists of several interspersed totalizers, and to aid in the following description of the special transfer mechanism, each totalizer on the front line has been designated by letters A, B, C, D, E, F, G, H, K, and T. It will be understood that all wheels A constitute a single totalizer, all wheels B another totalizer, and so on, up to and including all wheels T, which constitute a single totalizer.

The totalizers on the upper and back totalizer lines are likewise interspersed and have been given the same letters for the totalizers in the same relative positions as those on the front totalizer line.

The totalizers wheels T are the group or grand total wheels. The group or grand total totalizers are shown and described in the previously-mentioned Shipley Patent No. 1,761,542.

The transfer arms 190 (Fig. 15) for the adding wheels 78 on the front totalizer line function in the same manner as that described for the transfer arms 184 (Fig. 13) in transferring from one adding wheel to the adding wheel of next higher order.

In describing the transfer mechanism for the front line of totalizers, the totalizer T will be used as representative of all other totalizers on this line. The three highest order overflow wheels 79 (Fig. 25) of totalizer T are advanced one step by the transfer arms 189 (Fig. 14) each time their adjacent lower order totalizer wheels 79 pass through zero. The next three lower order overflow wheels 79 of totalizer T are advanced one step by the transfer arms 186 (Fig. 13) each time their adjacent lower order wheels 79 pass through zero. The lowest order overflow wheel 79 of totalizer T (the one at the extreme right in Fig. 25) is advanced one step by the transfer arm 186 associated with the right-hand secondary actuator rack 86, each time the left-hand totalizer wheel 78 of totalizer T (the tenth wheel 78 from the left in Fig. 25) passes from "9" to "0" by a special transfer mechanism which is tripped to transfer "1" into said overflow wheel 79 located at the right-hand end of the front totalizer line. This special mechanism will now be described.

When the left-hand totalizer wheel 78 of totalizer T (Figs. 17, 24, and 25) on the front totalizer line passes from "9" to "0", the long tooth 200 thereon strikes a pawl 225 and rocks the latter counter-clockwise against the action of a torsion spring 226. The pawl 225 is connected by a yoke 227 to a pawl 228. Both pawls 225 and 228 are pivoted on a stud 229 supported by a hub on the left-hand hanger 175. The spring 226 normally holds the pawl 228 in contact with a flange 230 on a lever 231 pivoted on a stud 232 on the hanger 175. When the pawl 225 is rocked counter-clockwise, as above described, the pawl 228 is rocked likewise, thereby disengaging it from the flange 230 and permitting a spring 233 to rock the lever 231 clockwise, and a surface 234 of the pawl 228 now rides on the flange 230. As the lever 231 is rocked clockwise, a stud 235 thereon, coacting with a cam slot 236 in an arm 237 secured to a shaft 238, cams said arm and shaft clockwise. The shaft 238 is carried by the various hangers 175 (Figs. 19 and 28) and has secured on its right-hand end an arm 239 (Figs. 16 and 24) carrying a pin 240.

A pawl 241 (Figs. 16 and 24) pivoted on a stud 242 in the right-hand hanger 175 is held in contact with the pin 240 by a spring 243, which also holds a finger 244 of the pawl 241 in front of a stud 245 on the transfer arm 186 associated with the right-hand secondary actuator rack 86 (Fig.

25). Clockwise movement of the shaft 238, by the long tooth 260 as above described, removes the finger 244 of the pawl 241 from the stud 245, whereupon the spring 197 rocks the above-mentioned transfer arm 136 one step. The spring 243 now rocks a pawl 246 and causes it to engage a shoulder 247 on the pawl 241 to retain the latter in its moved position until the transfer has been effected. This step of movement of the transfer arm 186 closes the gap between said arm and the rack 86.

As heretofore mentioned, the secondary actuator 85—86 is moved only to its zero position during adding operations. Thus, when said actuator moves counter-clockwise to its home position near the end of the operation, the transfer arm 186 moves with it and rotates the overflow wheel 79 of totalizer T at the extreme right (Figs. 24 and 25) one step of movement to add "1" thereon and complete the operation.

The transferring from the right-hand overflow wheel 79 of totalizer T to the next three higher order overflow wheels takes place in the usual manner, as above described, by the transfer arms 186 associated with these totalizer wheels.

When the fourth from the right overflow totalizer wheel 79 of the totalizer T passes from "9" to '0", the transfer into the next higher order (the fifth wheel T from the right in Fig. 25) takes place in the usual manner by the transfer arm 189 associated with this particular wheel. The transfer into the next two higher order overflow wheels 79 of the totalizer T (the sixth and seventh wheels from the right in Fig. 25) takes place in the usual manner by the transfer arms 189 associated with those wheels.

*Transfer mechanism back totalizer line*

The transfer arms 187 (Fig. 14) associated with the adding wheels 73 (Fig. 25) of the totalizers on the back line function to transfer "1" from the lower order adding wheel to the next higher wheel in the same manner as that described for the transfer arms 184 (Fig. 13) of the totalizers on the upper line.

When the highest order adding wheel 76 passes from "9" to "0" (again using the totalizer T for the example), the transfer arm 192 (Fig. 15) operates to add "1" into the lowest order overflow wheel 77 of the totalizer T (the third wheel T from the left, Fig. 25) to add "1" therein. Transfers from this wheel in the next left-hand wheel T and to the left-hand wheel T are effected by the transfer arms 192 associated with those wheels.

When the left-hand wheel 77 of the totalizer T on the back totalizer line passes from "9" to "0", it operates mechanism exactly like that described in connection with the front totalizer line for operating the overflow wheel 77 of the totalizer T (the one at the extreme right in Fig. 25 on the back totalizer line) to add "1" into that wheel. Therefore it is not thought necessary to describe that again, but all identical parts are given the same reference numbers in Figs. 16 and 17 as were given in connection with those parts for operating the transfer in connection with the front totalizer line, the only exception being that the transfer arm is numbered 185, as this is the number of all arms which are associated with the racks 86 for operating the overflow wheels 77 to turn in a carry or transfer to those totalizer wheels 77.

*Special transfer restoring means for front and back lines*

Figure 16:
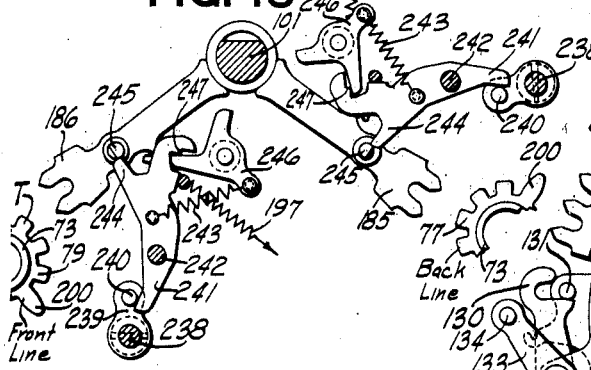
Fig. 16 shows the special mechanism for transferring into a wheel on the right end of the totalizer line under control of the next lower order wheel on the left end of said line.
Figure 17:
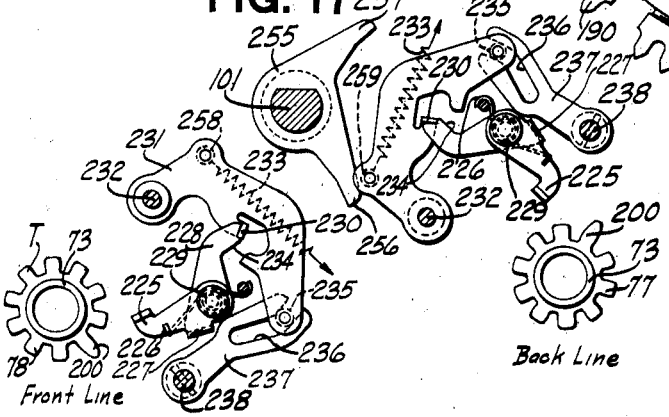
Fig. 17 shows the special mechanism associated with the totalizer wheel on the left end of the totalizer line for controlling the transfer from that wheel to the next higher order wheel on the right end of said line.

Means is provided for restoring the special transfer mechanism for the overflow wheels of the front and back totalizer lines as shown in Figs. 16, 17 and 24, to its normal untripped position during the first part of the next operation of the machine. This means includes a member 255 (Figs. 17 and 24) secured to the shaft 101 and having arms 256 and 257. As the shaft 101 and member 255 are rocked first clockwise and then counter-clockwise during the next operation of the machine, the arm 256 will, upon its clockwise movement, contact a pin 258 on the lever 231 associated with the front totalizer line and rock the latter counter-clockwise to its normal position, thereby returning the flange 230 into engagement with the pawl 228. As the lever 231 is rocked counter-clockwise, the stud 235 rocks the arm 237, shaft 238 and arm 239 counter-clockwise to their normal position. The restoring spider 214 associated with these special transfer pawls 246 (Fig. 16) restores said pawls to their normal positions at this time in the same manner as said spiders restore the pawls 211 to their normal positions. The driver for the left-hand transaction bank, associated with the keys 44, actuates the restoring spider 214 and the secondary actuator in the right-hand amount bank; that is, the amount bank to the left of said transaction bank.

*Differential mechanism—total taking operations*

When it is desired to take a sub-total or grand total from any particular totalizer, the total lever 47 is manually adjusted to any one of its various total taking positions to select the totalizer "line" in which the totalizer, from which a total is to be taken, is located. Only one totalizer "line" is selected during each total taking operation. The proper transaction or totalizer selecting key 44, 45 or 46 serves to control the endwise shifting of the totalizer "line" to bring the desired totalizer into alinement with the differential actuators. This mechanism is fully illustrated and described in the above mentioned Shipley Patent No. 1,619,796, and reference is made thereto for a full understanding of the same.

Movement of the total lever 47 to a total taking position causes the latter, through means old and well known in the art and fully illustrated and described in the above mentioned Shipley Patent No. 1,619,796, to condition the machine for a two-cycle operation. By two cycle operation it is meant that the main drive shaft 40 (Fig. 27) of the machine receives two complete revolutions in a clockwise direction during such operation.

During such total taking operations the gear 51 receives one full counter-clockwise rotation, whereas during adding operations said gear receives a one-half rotation only.

When the total lever 47 is moved to any one of its various total or sub-total taking positions, it, as above described, gives the shaft 162 (Fig. 26) an initial clockwise movement. During total and sub-total operations it is necessary that the shaft 162 be given a further rotation in addition to the above mentioned movement for a purpose to be hereinafter described. Such additional movement is caused by the following briefly described mechanism, such mechanism being fully illustrated and described in the above mentioned Bernis M. Shipley patent, No. 1,619,796.

Secured to this shaft 162 is an arm 270 (Fig.

27) connected by the link 271 to a lever 272 pivoted on a stud 273 mounted in the right side frame. The lever 272 is pivotally connected to a link 274 slidably mounted on the stud 53 which supports the large gear 51.

When the shaft 162 is rocked clockwise by movement of the total lever 47 into any of its total or sub-total positions the link 274 is moved towards the left far enough to disengage a roller 275 thereon from a notch 276 in a cam 277, and move said roller into a cam race 278 of the cam 277. This cam 277 is stationary during adding operations but when the link is moved towards the left for total taking as just described, the cam 277 is coupled to the gear 51 and therefore during total taking and sub-total taking operations the cam 277 is given one complete counter-clockwise rotation along with the gear 51. The link 274 has two studs 280 between which projects a flange 281 of a coupling slide 282 normally in a recess 283 in the rear of the cam 277. When the link 274 is moved to the left as above described the slide 282 is also moved to the left until a narrow portion thereof enters a notch 284 in the rear of the gear 51 thus coupling the gear 51 and the cam 277 so that they operate in unison. The cam race 278 is so timed that near the end of the first cycle of rotation of the shaft 40 during total and sub-total operations the shaft 162 is given a further clockwise rotation and just before the end of the second cycle or rotation of the shaft 40 the shaft 162 is rotated counter-clockwise to the position in which it was left by movement of the total lever.

During the initial clockwise movement of the shaft 162 it will be recalled that the stud 167 (Fig. 21) through the cam slot 168 rocks the arm 169 and shaft 170 clockwise. However, when the shaft 162 is given its extra movement by the cam 277 as just described, the stud 167 rides in a portion 285 of the cam slot 168 which portion 285 is concentric with the center of the shaft 162 after the arm 169 has been moved by the initial movement of the shaft 162 and therefore continued movement of the shaft 162 and stud 167 does not cause any further movement of the arm 169 and the shaft 170 to which it is secured.

This pin 167 also projects through a slot 290 (Fig. 18) of an arm 291 pivoted on the rod 111. This part of the slot 290 is concentric with the center of the shaft 162 and therefore during the initial movement of the shaft 162 the arm 291 is not moved. However, during the movement of the shaft 162 by the cam 277 the stud 167 co-operates with a position 292 of the slot 290 thus rocking the arm 291 in a clockwise direction.

Connecting the arm 291 to an arm 293 (Fig. 21) fast on a shaft 294 is a link 295 whereby the clockwise movement of the arm 291 is imparted to the shaft 294.

The following mechanism is duplicated for each amount differential.

Secured to the shaft 294 is an arm 300 (Fig. 19) pivoted to the lower end of a link 301, carrying a pin 302 projecting through a cam slot 303 in a spider 304 loosely mounted on the hub 196 (Fig. 31) of the secondary actuator. The spider 304 has three arms 305 bifurcated to embrace levers 306 pivoted to the hanger 175. There are three levers 306 associated with each spider 304, each of said levers corresponding to a different totalizer "line." Each of the levers 306 has a nose 307 which normally lies out of the path of movement of the long teeth 200 on its respective totalizer wheels.

When the shaft 294 is rocked counter-clockwise, as above described, the arm 300 draws the link 301 downwardly, thereby causing the pin 302 to rock the spider 304 counter-clockwise. Such movement of the spider 304 rocks the levers 306 clockwise to a point where the noses 307 thereon are in the paths of movement of the long teeth 200 on their associated totalizer wheels.

During such total taking operation, the adding and overflow wheels comprising the selected totalizer are not engaged with their respective actuators until near the end of the first cycle of said operation, after the driving segments 100 have returned to their home positions. Thus, at the beginning of the second cycle of said operation, the driving segments 100 will turn the actuators and the totalizer wheels engaged therewith until the latches 102 of said actuators are disconnected from the segments 100 by means under control of the long teeth 200 on the totalizer wheels as the latter reach their zero positions. Such means will now be described.

Each actuator, as it is moved clockwise by its respective driving segment 100, turns the totalizer wheel engaged therewith counter-clockwise until the latter reaches its zero position, when the long tooth 200 thereon strikes the nose 307 (Fig. 19) of its corresponding lever 306 and rocks said lever counter-clockwise. The lever 306, in turn, rocks the spider 304 clockwise.

The pin 302 which projects through the slot 303 in the spider 304 also extends through a bifurcated portion of an arm 310 (Figs. 19, 22 and 23) freely mounted on a rod 311 supported by the hangers 175. The arm 310 is secured to a pawl 312 also freely mounted on the rod 311. The pawl 312 is adapted to be rocked counter-clockwise to engage teeth 313 on a segment 314 formed integral with the arm 105 to cause disengagement of the latch 102 from the driving segment 100. The pawl 312, however, is normally held out of engagement with the teeth 313 by a spring 315 connected to the arm 310 and to a pin 316 on the hanger 175. The spring 315 normally holds the arm 310 against a stud 317 suitably mounted in the machine.

As the spider 304 is rocked clockwise, as above described, the pin 302 rocks the arm 310 counter-clockwise, against the action of the spring 315, to engage the pawl 312 with the tooth 313 opposite said pawl at the time and thereby arrests the movement of the arm 105. This causes the diagonal slot 106 (Fig. 11) in the arm 105 to disengage the latch 102 from the driving segment 100, thereby arresting the actuator in a position corresponding to the amount which was standing on the totalizer wheel.

With the actuator thus positioned according to the amount which was standing on the totalizer wheel, the beam 122 and link 124 operate in the same manner as that described for adding operations to adjust the indicating mechanism and printing mechanism a like extent.

In the performance of sub-total taking or "read" operations, the totalizer wheels remain engaged with the actuators as the latter are moved counter-clockwise to their home positions by the segments 100, thus adding back onto the totalizer wheels the amounts originally standing thereon. On the other hand, when performing grand total taking or "totalizer reset" operations, the totalizer wheels are disengaged from the actuators at the end of the clockwise movement of the driving segments 100, thus leaving the totalizer wheels in their zero positions as fully described and illustrated in the above mentioned Shipley Patent No. 1,619,796.

*Indicating mechanism*

The present machine is provided with indicators of the type shown and described in the Shipley Patent 1,619,796. These indicators (not shown herein) are arranged to indicate simultaneously separately the amounts set up on the different sections of the keyboard. During sub-total or grand total taking operations such indicators are disabled by means illustrated and described in said Shipley Patent. Since the construction of these indicators and the means for elevating them to indicating position and lowering them to non-indicating position is fully illustrated and described in said Shipley patent, no showing or description thereof is thought necessary herein.

Means is provided for setting the indicators (not shown) which means includes the separate beam 122 (Fig. 8) and link 124. The links 126 (Fig 4) are pivoted at their upper ends (Fig. 4) to segments 330 secured to nested sleeves 331 mounted on a shaft 332 journaled in the side frames of the machine. These segments select the indicator tablets (not shown) preparatory to their being elevated to indicating positions by means old and well known in the art, as disclosed in the Shipley Patent 1,619,796, hereinbefore referred to. The usual aliners 333 are provided to maintain the segments 330 in proper alinement after they have been differentially set under control of their respective differential mechanisms by the beam 122 (Fig. 8) and roller 270 as previously stated.

*Printing mechanism—adding operations*

The present machine is provided with printing mechanism of the same type as that shown and described in the aforesaid Kreider patent. This mechanism is so arranged that, during each adding operation, it will print simultaneously on both a detail strip and on an inserted slip, in columnar arrangement, the amounts set up on the different sections of the keyboard, transaction characters for each of said amounts, and the date.

Such printing mechanism includes two lines of type wheels (Fig. 3), in duplicate, one line disposed directly above the other, the upper line (Fig. 2) serving to print on the detail strip while the lower line (Fig 32) prints on an inserted slip, in substantially the same manner as shown and described in the Shipley Patent No. 1,619,796 hereinbefore referred to. The type wheels on the upper type line are duplicates of the type wheels on the lower type line, with common means employed for simultaneously setting the corresponding type wheels on both of said lines.

Each type line includes three sets of type wheels 340, 341 and 342 (Figs. 2 and 32) for printing the different amounts set up on the different groups of amount keys comprising the split keyboard. For instance, the type wheels 340 are associated with the front line of totalizers (Fig. 25) and are adjusted under control of the amount keys 41 (Fig. 1); the type wheels 341 are associated with the back line of totalizers and are adjusted under control of the amount keys 42; while the type wheels 342 are associated with the upper line of totalizers and are adjusted under control of the amount keys 43.

Also arranged on the upper type line are three printing wheels 343, 344 and 345 (Fig. 32) for printing characters designating the totalizers into which the different amounts are added. For example, the type wheel 343 is associated with the front totalizer line (Fig. 25) and is adjusted under control of the transaction keys 44 (Fig. 1); the type wheel 344 is associated with the back totalizer line and is adjusted under control of the transaction keys 45; while the type wheel 345 is associated with the upper totalizer line and is adjusted under control of the transaction keys 46. Thus during printing the transaction type wheel 343 corresponds to the set of amount type wheels 340; the transaction type wheel 344 corresponds to the set of amount type wheels 341; and the type wheel 345 corresponds to the set of amount type wheels 342.

Each of the type wheels 340 to 345, inclusive, is loosely mounted on a rod 347 mounted in auxiliary frames 348 and 349 (Fig. 2). The groups of type wheels 340, 341 and 342 are spaced on the rod 347 by collars 350.

Each of the amount type wheels 340, 341 and 342 and transaction type wheels 343, 344 and 345 is differentially set during adding operations by its associated differential mechanism, under control of the amount keys or transaction keys corresponding thereto. Since each of said type wheels is differentially set by its associated differential mechanism in substantially the same manner, a description of how the right-hand amount type wheel 342 is set by its differential mechanism, under the control of the right-hand bank of amount keys 43, will suffice for all.

Depression of any one of the keys 43 in this bank (Figs. 1 and 4) arrests the main actuator 84 and, consequently, positions the link 126 corresponding to the value of the key depressed, as hereinbefore described. The link 126 has pivoted thereto an arm 355 loosely mounted on a shaft 356 carried by the side frames of the machine. Secured to the arm 355 is a segment 357 meshing with a helical gear 358 secured to a shaft 359 supported by frames 349, 351, and 352 (Fig. 2). Secured to the shaft 359 is a segment 360 (Fig. 4) which meshes with a rack 361. The rack 361 meshes with a gear 362 secured to the outer tube 363 of a nest of tubes on a shaft 364. Upon the other end of said tube 363 is a gear 365 (Fig. 2), which meshes with the right-hand type wheel 342. A sleeve 366 spaces the gears 362 and 365.

It will thus be seen from the above that when the link 126 is adjusted commensurate with the value of a depressed amount key 43, it will cause the right-hand type wheel 342 to be adjusted accordingly.

The type wheels 341 are set by gears 367 (Fig. 2) on the tubes 363, which are also secured to gears 368 set by racks 369 under control of the keys 42.

Another rod 380 (Fig. 2), also carried by the frames 348, 349, and 351, carries tubes 381 (Fig. 3) on which are also secured gears 382 and 383 (Fig. 2) for adjusting the amount type wheels 340, the gears 383 being driven by racks 384 under control of the keys 41. Tubes 385 connect gears 386 and 387 for adjusting the transaction type wheels 343 to 345, inclusive, the gears 387 being driven by racks 388 under control of the keys 44, 45 and 46.

Mounted adjacent the transaction type wheels 345 is the usual "X and Z" type wheel 390 (Figs. 2 and 31) for printing an "X" to indicate subtotal taking or "read" operations, and a "Z" to indicate grand total taking or totalizer resetting operations. During adding operations, a blank space on said wheel is moved into printing position so that no such designating character will be printed. This type wheel is adjusted by means under control of the total lever 47 and its plate 70 (Fig. 26), which will now be described.

Pivoted to the total lever plate 70 is a link 391 connected to an arm 392 loose on the shaft 356. Rigid with the arm 392 is a spiral segment 393 which meshes with a helical gear 394 secured to a shaft 395. Secured to the shaft 395 is a segment 396 meshing with a rack 397, which meshes with a gear 398 secured to one end of the nested tubes 385 (Fig. 2). Secured at the other end of said tube is a gear 399 which meshes with the "X and Z" wheel 390.

From the above it will be seen that when the total lever 47 is moved either upwardly or downwardly to condition the machine for a total taking operation, it will, through the link 391 and train of mechanism just described, set the type wheel 390 accordingly.

Arranged near the left end of the type wheel line is a set of four date printing wheels 400 for printing the date during each operation of the machine. Any suitable setting means, such, for example, as that disclosed in the before-mentioned Shipley Patent No. 1,619,796, may be employed for setting these date printing wheels.

Fig. 32 shows a printing hammer 401 which is associated with all three sets of amount type wheels 340, 341, and 342 on the lower type line. During each adding operation, the hammer 401 is operated to take impressions from said type wheels.

Suitable means is provided, under control of the total lever 47, for controlling the effectivity of the printing hammer 401. For example, when the total lever 47 is in its normal "add" position, it will, through said means, render the printing hammer 401 effective, but when said lever is moved to any one of its various total taking positions, it will cause the printing hammer 401 to be rendered ineffective. The means by which the total lever 47 thus controls the effectivity of the hammer 401 will be fully described hereinafter in connection with the operation of the printing mechanism during total taking operations.

There is also provided a single printing hammer 402 which is common to all three of the transaction type wheels 343, 344, and 345, which hammer is effective during both adding and total taking operations. In addition, there is a single printing hammer 403 for the set of date wheels 400, which hammer is also effective during both adding and total taking operations.

*Printing mechanism—total taking operations*

As hereinbefore mentioned, the present machine is adapted to perform both sub-total taking or "read" operations and grand total taking or "reset" operations. For printing such sub-totals and grand totals on both a detail strip and on an inserted slip, in columnar arrangement, the printing mechanism is provided with three separate sets of amount type wheels 410, 411 and 412 (Figs. 2 and 32) on both the upper type line and on the lower type line. Inasmuch as said wheels on the upper type line are identically the same as those on the lower type line, with common means for simultaneously adjusting the corresponding type wheels on both of said lines, only the type wheels on the upper line and the means for adjusting the same will be described herein.

Each one of said sets of type wheels 410, 411 and 412 is associated with a different one of the totalizer lines (Fig. 25) and is employed to print either subtotals or grand totals, as desired, from the various totalizers on its respective totalizer line. For example, the type wheels 410 are associated with the upper totalizer line (row I); the type wheels 411 are associated with the back totalizer line (row II); and the type wheels 412 are associated with the front totalizer line (row III).

Each of the type wheels 410, 411 and 412 is mounted on the rod 347 in the same manner as the amount type wheels 340, 341 and 342, hereinbefore described, and are spaced apart by collars 413.

In connection with total taking operations, the type wheels 340, 341 and 342 will be considered as one complete set of type wheels, representing ten different denominational orders. Means is provided for simultaneously adjusting all three sets of type wheels 410, 411 and 412 through the adjustment of the sets of type wheels 340, 341 and 342. Such means is fully illustrated and described in the aforesaid Kreider patent and therefore only a brief description thereof will be given herein.

Meshing with the gears 365, 367 and 414 for the type wheels 342, 341 and 340, respectively are double gears 415 (Figs. 2 and 3), having both internal and external teeth. Each double gear 415 has its bearing on a stationary disc 416 carried by a hexagon shaped rod 417 supported by the frames 348 and 351. The disc 416 is held stationary and the double gear 415 is permitted to rotate on said disc. The gear 415 and disc 416 are held in proper lateral alinement by means of spacing discs 418 (Fig. 2).

The discs 416 are each provided with a bearing (Fig. 3) in which is mounted a pinion 419. Each group of pinions 419 are mounted on a square shaft 420 (Fig. 2) for uniform movement. As shown herein, ten shafts 420 (Fig. 3) are provided, one shaft being provided for each denomination of type wheels. The pinions 419 are loosely mounted on the shafts 420 but are held in proper alinement with the internal teeth of the double gears 415 by means of spacing discs (not shown). However, inasmuch as the shafts 420 are square, said shafts will turn with the pinions 419 when the double gears 415 are rotated. Plates 421 (Fig. 2) maintain the shafts 420 in proper lateral alinement.

Owing to the different locations on the various totalizer lines of the totalizer wheels of corresponding denominational order, and the fact that all three sets of type wheels 410, 411 and 412 are adjusted simultaneously to correspond to the adjustment which the type wheels 340, 341 and 342 receive, some arrangement must be provided for transposing the type wheels 411 and 412 so that they will print in proper sequence. This is accomplished by the particular location of the pinions 419 on the shafts 420. Mounted on each of the shafts 420 are four pinions 419, each of which meshes with a double gear 415 associated with one of the sets of type wheels 340, 341, 342, 410, 411 or 412. Fig. 32 is a diagrammatic view showing the special arrangement of the pinions 419 on the shafts 420 for not only simultaneously adjusting the different sets of type wheels 410, 411 and 412, but also for transposing the various wheels comprising the sets of type wheels 411 and 412 so that they will print in proper sequence.

Fig. 2 shows the right-hand type wheel 342 and the shaft 420, with the pinions 419 thereon, through which said wheel 342 simultaneously adjusts a type wheel of different order in each of the three sets of type wheels 410, 411 and 412 during each operation of the machine. For example, said type wheel 342 simultaneously adjusts the units or first order type wheel in the set of type wheels 410, the seventh order type wheel in the set of type wheels 411, and the fourth order type wheel in the set of type wheels 412. In this way the type wheels 411 and 412 are transposed to print in proper sequence during total taking operations.

It will thus be seen from Fig. 2 that when the right-hand type wheel 342 is adjusted, the associated gear 365 will also adjust the double gear 415 associated therewith a like extent. Such adjustment of the double gear 415 causes the pinion 419 cooperating therewith to rotate, thereby rotating the shaft 420. The rotation of the shaft 420 causes all of the other pinions 419 thereon to rotate their respective double gears 415 which are associated with the remaining three sets of type wheels 410, 411 and 412. The external teeth of these double gears 415 mesh with gears 422 (Fig. 2) which in turn mesh with the type wheels 410, 411 and 412. Thus it will be seen that when the type wheels 340—341—342 are adjusted, the type wheels 410, 411 and 412 on both the upper and lower type lines are adjusted the same extents.

*Printing hammers*

Associated with the sets of type wheels 410, 411 and 412 on the lower type line (Fig. 32) are printing hammers 426, 427 and 428, respectively. The total lever 47 is adapted to adjust a plurality of notched discs 429 to 432, inclusive, secured on the shaft 395, to selectively control the operation of each of said hammers, as well as the hammer 401 associated with the type wheels 340, 341 and 342, hereinbefore mentioned. More specifically, the discs 429, 430, 431 and 432 control the operation of the hammers 401, 426, 427 and 428, respectively.

The discs 429 to 432, inclusive, being secured on the shaft 395, are adjusted by the total lever 47 in the same manner as when the latter actuates the shaft 395 to adjust the "X—Z" printing wheel 390, previously described. Fig. 32 shows the positions assumed by the discs 429 to 432, inclusive, when the total lever 47 is in its normal or "add" position. When thus positioned, the notched portion of the disc 429 is in a position to permit its associated hammer 401 to be operated, while unnotched portions of the remaining discs 430, 431 and 432 are in positions to prevent operation of their respective hammers.

The notches in the discs 429 to 432, inclusive, are so arranged that only a notched portion of one of said discs will be positioned during each operation of the machine to permit operation of its associated hammer, while the unnotched portions of the remaining discs act to prevent operation of their respective hammers. Each of the discs 430, 431 and 432 is provided with two notches, so that when any one of said discs is adjusted by the total lever when the latter is moved to either a sub-total taking position or grand total taking position, one of said notches will be in the proper position to permit the operation of its associated hammer.

The mechanism under control of the above mentioned notched discs for throwing off the printing hammers is old and well known in the art, as shown and described in the patent to B. M. Shipley, No. 1,747,397, dated February 18, 1930. In the present application only one train of mechanism is shown and described for throwing off one of the printing hammers.

The discs 430 to 432, inclusive, are also adapted to control the printing hammers for the upper type line to print in columnar arrangement. The mechanism for controlling these hammers is not shown herein but is fully disclosed and described in the above mentioned Shipley patent, No. 1,747,397.

In view of the detailed description in said Shipley patent it is not thought necessary to describe each train of mechanism for throwing off the hammers 403, 426, 427 and 428, and therefore the disclosure herein will be limited to one train of mechanism, since this train of mechanism illustrates the method of controlling the printing hammers.

Shown in Fig. 33 is a side view of a portion of the printing hammer 428 and the throw-off mechanism associated therewith, together with the disc 432 for controlling said mechanism. A description now of the manner in which the disc 432 controls the throw-off mechanism for the hammer 428 will suffice for the other hammers 401, 426 and 427.

The hammer 428 has an arm 440 (Fig. 33) which carries a stud 441 cooperating with a bell crank 442 pivotally mounted on a rod 443 suitably mounted in the machine. One arm of said bell crank 442 normally rests just beneath the stud 441 on said hammer. The other arm of the bell crank 442 is slotted to receive a pin 444 on a lever 445 pivotally mounted on a rod 446 also suitably mounted in the machine. The lever 445 carries a roller 447 which is adapted to coact with the periphery of the disc 432. A spring 448 normally maintains the roller 447 in cooperative relation with the periphery of the disc 432. When the roller 447 is resting upon an unnotched portion of its appropriate cam disc 432, the bell crank 442 will be held with its arm beneath the stud 441, which will retain the corresponding printing hammer in its normal position, and will not permit this hammer to be rocked downwardly and returned to take an impression.

When, however, the cam disc 432 is set to such a position that a notched portion thereof is opposite the roller 447 the lever 445 will be rocked clockwise by the spring 448, and through the pin and slot connection the bell crank 442 will be rocked counter-clockwise to remove its arm from beneath the stud 441 on the arm 440 of its respective printing hammer. This will permit the printing hammer 428 to be moved clockwise preparatory to being given a rapid counter-clockwise movement to take an impression from the lower type wheels 412.

*Operation*

A brief description of the operation of the present machine will now be given for the purpose of a better understanding of the invention.

Let it be assumed that the present machine is used in a store employing a cashier system. Such a store consists of three departments or counters, such as a meat counter, a vegetable counter and a staple goods counter. A number of clerks are stationed at each of the counters to serve the customers. A customer, after making purchases at each of the three mentioned counters, presents his purchases to the cashier who will enter separately the total amounts of the purchases made at each of the different counters into the machine in the following manner.

The total amount of purchases made at the meat counter is set up on the amount keys 41 (Fig. 1) and the appropriate clerk's key 44 depressed; the total amount of purchases made at the vegetable counter is set up on the amount keys 42 and the appropriate clerk's key 45 is depressed; while the total amount of purchases made at the staple goods counter is set up on the amount keys 43 and the appropriate clerk's key 46 is depressed. With the total lever 47 in its normal "add" position, the operator then depresses the usual motor bar to operate the machine to add simultaneously into each of the totalizers selected by the keys 44, 45 and 46 the various amounts simultaneously set up on the different groups of amount keys 41, 42 and 43.

As hereinbefore mentioned, each differential mechanism associated with each of the banks of amount keys 41, 42 and 43 includes both a main actuator and a secondary actuator. Also there is a separate line of totalizers, comprising adding wheels and overflow wheels, associated with each of the different groups of amount keys 41, 42 and 43. For example, the row III or front totalizer line (Fig. 25) is associated with the group of amount keys 41, the row II or back totalizer line is associated with the group of amount keys 42, while the row I or upper totalizer line is associated with the group of amount keys 43. On the other hand, the bank of keys 44 select the totalizers on the front totalizer line, the bank of keys 45 control the selection of the totalizers on the back totalizer line, while the bank of keys 46 control the selection of the totalizers on the upper totalizer line.

During such adding operation, the amount keys 41, 42 and 43 control the differential positioning of only the main actuators associated therewith to add into the adding wheels of the totalizers which have been selected on their respective totalizer lines. For example, the keys 41 control the differential positioning of their respective main actuators 90 (Fig. 15) to add into the adding wheels 78 on the front totalizer line (Fig. 25); the keys 42 likewise control their respective main actuators 87 (Fig. 14) to add into the adding wheels 76 on the back totalizer line; while the keys 43 control their respective main actuators 84 to add into the adding wheels 74 on the upper totalizer line.

During such operation, the transfer arms 191—192, 188—189 and 185—186 related to the secondary actuators 91—92, 88—89 and 85—86 associated with the main actuators 90, 87 and 84, respectively, engage the overflow wheels of the totalizers on the various totalizer lines to add "1" into any of said overflow wheels in case of a tens transfer. These secondary actuators themselves are incapable of adding into said overflow wheels during adding operations.

It will be noted that on the row II or back totalizer line (Fig. 25) the overflow wheels 77 are located adjacent both the highest and lowest order adding wheels of the totalizers on said line, while on the row III or front totalizer line the overflow wheels 79 are located adjacent the lowest order adding wheels of the totalizers on said line. Novel means is provided for transferring "1" from the extreme left-hand overflow wheel 77 or adding wheel 78, whichever the case may be, on the back totalizer line and front totalizer line, respectively, to the right-hand overflow wheels 77 or 79 on said lines.

The main actuators 84, 87 and 90 control the adjusting of indicating and printing mechanism to indicate and print amounts commensurate with the values of the keys 41, 42 and 43 depressed, as well as characters corresponding to the keys 44, 45 and 46 which are depressed.

When the operator desires to take a total from any of the totalizers, the total lever 47 is moved manually either upwardly or downwardly, depending upon whether it is desired to take a subtotal or a grand total. In either case, the total lever 47 is positioned to select the particular totalizer line on which the totalizer from which a total is to be taken is located.

Movement of the total lever 47 to any of its sub-total or grand total taking positions adjusts means to cause the secondary actuators 91—92, 88—89 and 85—86 to be coupled to their respective main actuators 90, 87 and 84, respectively. During such total taking operation, the main actuator and its associated secondary actuator of each differential unit, being thus coupled together, function as a single actuating unit. In total taking operations only one totalizer line is engaged with the differential mechanism, depending upon which totalizer line the total lever 47 is adjusted to select. Depression of one of the keys 44, 45 or 46 controls the lateral shifting of the selected totalizer line to bring the totalizer wheels of the selected totalizer into alinement with the differential actuators.

During such total taking operation, the main actuators, together with the secondary actuators coupled thereto, are differentially positioned, under control of the totalizer wheels, an extent commensurate with the amount standing on the wheels of the totalizer selected. This causes the links 126 (Fig. 4) to be set accordingly, thereby adjusting printing mechanism to print the amount standing on the selected totalizer.

During total taking operation, the set of type wheels 340—341—342 (Figs. 2 and 32) is adjusted by the different differential actuators in accordance with the amount standing on the selected totalizer. The movement thus imparted to the type wheels 340—341—342 is also transmitted, by means of the double gears 415 and the pinions 419, to each type wheel of like denomination in each of the three sets of type wheels 410, 411 and 412. The special arrangement of the pinions 419 on the various shafts 420 serves to transpose the type wheels in each of the sets of type wheels 411 and 412 so that they will print in proper sequence. The discs 429 to 432, inclusive, under control of the total lever 47, release for operation only that printing hammer associated with that particular set of type wheels 410, 411 or 412 from which a total is to be printed.

While a specific store system, namely, a cashier system, has been described in the operation as being one system in which the present invention may be used, it is to be distinctly understood that it is not intended to confine or limit this invention to one type of system, as there are many other systems of business wherein this invention can be effectively used without in any way departing from the spirit of the invention.

For example, the machine may be used in a filling station or service station where gasoline and oil are sold, and in such a case the banks of clerks' keys 44 and 45 will not be necessary and could be omitted from the machine. However, the totalizer selecting cams would be connected together to shift all three lines of totalizers simultaneously, as shown in Fuller 1,242,170, and the bank of clerks' keys 46 would be used to control the selection and engagement of totalizers on all three lines simultaneously. The engagement control would be effected by means of the selecting plates which are common to machines of this type and are fully described and illustrated in the above-mentioned Shipley Patent No. 1,619,796 and also in a patent to Frederick L. Fuller, No. 1,394,256 dated October 18, 1921.

In this system, the keys 43 could be used for registering the amount of money taken in for the sale of gasoline, the keys 42 for registering the amount of money taken in for the sale of oil, and the keys 41 for registering the amount of tax on the sale.

With this system, it is possible for the proprietor to have a complete record of each clerk, which record consists of the amount of money taken in for the sale of gasoline, the amount taken in for the sale of oil, and the amount taken in for taxes on the merchandise sold by this clerk, because each time any one of the clerks operates the machine, he automatically selects a totalizer on the upper line to register the amount of money for gasoline, a corresponding totalizer on the back line to register the amount of money for oil, and a corresponding totalizer on the front line to register the amount of tax on his sale.

A machine embodying this invention might be used in a central office wherein the records from several gasoline stations come in, and the row of keys 46 then would be used to designate the various stations. The keys 43 would still be used to register the amount of gasoline sold by the stations, the keys 42 the amount of oil sold, and the keys 41 the amount of tax taken in on those sales.

While the form of mechanism herein shown and described is admirably adapted to fulfil the objects primarily stated, it is to be understood that it is not intended to confine the invention to the one form or embodiment herein disclosed, for it is susceptible of many embodiments, all coming within the scope of the claims which follow.

What is claimed is:

1. In a machine of the class described, the combination of a plurality of sets of totalizers having adding wheels and overflow wheels; and a plurality of sets of differential mechanisms, each set of differential mechanisms including main actuators and secondary actuators, each set of main actuators cooperable with a separate set of the adding wheels of the sets of totalizers, each set of secondary actuators cooperable with the sets of overflow wheels of the sets of totalizers other than the totalizers with which their respective sets of main actuators are associated.

2. In a machine adapted to perform a plurality of types of operations, the combination of a plurality of sets of totalizers having adding wheels and overflow wheels; a plurality of sets of differential means, each set including main actuators and secondary actuators, each set of main actuators cooperable with a separate set of the adding wheels of the sets of totalizers to actuate the associated adding wheels during one type of operation, each set of secondary actuators cooperable with the sets of overflow wheels of the totalizers other than the totalizers with which the respective sets of main actuators cooperate for operating said sets of overflow wheels during another type of operation; operating means to operate the main actuators during both types of operation; and a coupling device to couple the secondary actuators to the main actuators to be driven thereby during said another type of operation.

3. In a machine of the class described, the combination of a plurality of sets of amount determining devices; a plurality of totalizers having adding wheels and overflow wheels, the adding wheels of each totalizer being located in working relation to a separate one of said sets of amount determining devices; a plurality of sets of differential means, each set including main actuators, and secondary actuators normally disconnected from the main actuators, each set of main actuators being controllable by a separate set of said sets of amount determining devices to actuate the adding wheels under control of the sets of amount determining devices during adding operations, each set of secondary actuators cooperable with the overflow wheels of the totalizers, other than the totalizers with which their respective sets of main actuators are associated, during total-taking operations; and means to condition certain elements of the machine for total-taking operations and to simultaneously connect the secondary actuators to the main actuators.

4. In a machine of the class described, the combination of a plurality of totalizers, each totalizer comprising adding wheels and overflow wheels; and a differential mechanism comprising a main actuator and a secondary actuator, said main actuator coactable with an adding wheel of one of said totalizers and said secondary actuator coactable with an overflow wheel of each of the remaining totalizers.

5. In a machine adapted to perform adding and total taking operations, the combination of a plurality of groups of manipulative devices; a plurality of totalizers, each totalizer comprising adding wheels and overflow wheels, each of said totalizers being associated with a different one of said groups of manipulative devices; and a plurality of differential mechanisms each comprising a main actuator and a secondary actuator, said main actuators being differentially controlled by said manipulative devices during adding operations to actuate the adding wheels of said totalizers, said secondary actuators being differentially controlled during total taking operations by the overflow wheels of said totalizers.

6. In a machine adapted to perform adding operations and total taking operations, the combination of a plurality of groups of depressible amount keys; a plurality of totalizers, one for each group of amount keys, each totalizer comprising adding wheels and overflow wheels; a plurality of groups of differential mechanisms; operating means therefor; each group of differential mechanisms being controllable by a different group of keys to control the differential positioning of the mechanisms, each of said mechanisms comprising a main actuator to actuate the adding wheels and an auxiliary actuator to actuate the overflow wheels, said auxiliary actuators being normally uncoupled from their operating means, said main actuators being operated during adding operations to add simultaneously on the adding wheels of their associated totalizers amounts commensurate with the value of the keys depressed in their associated groups of keys, said main actuator being also operated during total taking operations to actuate the adding wheels of said totalizers; and coupling means to couple said auxiliary actuators to the operating means to cause the auxiliary actuators to be operated during total taking operations to actuate the overflow wheels of said totalizers during said total-taking operations.

7. In a machine of the class described, the combination of a plurality of totalizers, each totalizer comprising adding wheels and overflow wheels, the adding wheels of each of said totalizers being normally disposed in different longitudinal relationship to the adding wheels of the other of said totalizers, while the overflow wheels of said totalizers are normally disposed longitudinally in positions corresponding to the positions normally assumed by the adding wheels of the other of said totalizers; and differential mechanisms, each comprising a main actuator and a secondary actuator, said main actuators being adapted to actuate the adding wheels of said totalizers, said secondary actuators being adapted to actuate the overflow wheels of said totalizers.

8. In a machine adapted to perform a plurality of types of operations, the combination of a plurality of totalizers having adding wheels and overflow wheels; a plurality of differential units, each unit having a main actuator and a secondary actuator, the main actuator and the secondary actuator of each unit being located in a common plane and in the same plane with one adding wheel and one overflow wheel and so located in said plane that the main actuator is capable of actuating the said one adding wheel during one type of operation and the secondary actuator is capable of actuating the said one overflow wheel, the secondary actuators being normally ineffective during said one type of operation but being coupled with the main actuators during another type of operation to actuate the overflow wheels of the totalizers; means to operate the main actuator; and means intermediate the main actuator of each unit and its secondary actuator for coupling said main and secondary actuators during said another type of operation.

9. In a machine of the class described, the combination of a totalizer including a plurality of totalizer elements to receive amounts under direct control of amount keys; overflow wheels arranged adjacent the highest order element; overflow wheels arranged adjacent the lowest order element; transfer mechanism operated from the highest order element to accumulate in the adjacent overflow wheels; and transfer mechanism intermediate the highest order of said last-mentioned overflow wheels and the lowest order of the overflow wheels adjacent the lowest order element to add one in the last-mentioned lowest order overflow wheel when the highest order overflow wheel adjacent the highest order element exceeds its capacity.

10. In a machine of the class described, a totalizer having adding wheels and overflow wheels, said overflow wheels being located adjacent both the highest and lowest order adding wheels; differential means to actuate the adding wheels for entering amounts into the adding wheels; and carrying mechanism to actuate the lowest order overflow wheel when the highest order adding wheel passes from "9" to "0" to add "1" into the overflow wheels.

11. In a machine adapted to perform adding and total-taking operations, the combination of a plurality of sets of amount determining devices; a plurality of totalizers having adding wheels and overflow wheels, the adding wheels of each totalizer being located adjacent a separate one of said sets of amount determining devices; a plurality of sets of differential means, each set including main actuators and secondary actuators, each main actuator having a secondary actuator separately mounted adjacent thereto and all of the said actuators being separately mounted on a common support, each set of main actuators cooperable with a separate one of said sets of amount determining devices to actuate the adding wheels during total-taking operations under control of the wheels which they are actuating and during adding operations under control of the set of amount determining devices adjacent the adding wheels, each set of secondary actuators cooperable with the overflow wheels of the totalizers other than the totalizers with which their respective sets of main actuators cooperate to actuate said overflow wheels during said total-taking operations; and means to connect each secondary actuator to the adjacent main actuator during total-taking operations.

12. In a machine of the class described having a keyboard split into a plurality of sections, a plurality of sets of actuators, each set of actuators being related to one of said sections of the keyboard and controlled by the keys of its related set; and a plurality of totalizers, each totalizer having adding wheels and overflow wheels and each totalizer being related to one of said sections of the keyboard, the adding wheels of each totalizer located adjacent to its related set of actuators for receiving entries therefrom, the totalizers and the sets of actuators being so arranged that each set of actuators has adjacent thereto the adding wheels of its related totalizer and overflow wheels of other totalizers.

PASCAL SPURLINO.
WILLIS E. EICKMAN.